United States Patent
Shahriar et al.

(10) Patent No.: US 10,841,183 B1
(45) Date of Patent: Nov. 17, 2020

(54) METHOD AND SYSTEM FOR RELIABILITY-AWARE EMBEDDING OF A VIRTUAL NETWORK ONTO AN ELASTIC OPTICAL NETWORK

(71) Applicants: Huawei Technologies Canada Co., Ltd., Kanata (CA); University of Waterloo, Waterloo (CA)

(72) Inventors: Nashid Shahriar, Waterloo (CA); Shihabur Rahman Chowdhury, Kitchener (CA); Sepehr Taeb, Waterloo (CA); Raouf Boutaba, Waterloo (CA); Jeebak Mitra, Ottawa (CA); Mahdi Hemmati, Ottawa (CA)

(73) Assignees: Huawei Technologies Canada Co., Ltd., Kanata (CA); University of Waterloo, Waterloo (CA)

( * ) Notice: Subject to any disclaimer, the term of this patent is extended or adjusted under 35 U.S.C. 154(b) by 0 days.

(21) Appl. No.: 16/657,635

(22) Filed: Oct. 18, 2019

(51) Int. Cl.
| | |
|---|---|
| *H04B 10/032* | (2013.01) |
| *H04L 12/24* | (2006.01) |
| *H04Q 11/00* | (2006.01) |
| *H04L 12/715* | (2013.01) |
| *H04L 12/703* | (2013.01) |

(52) U.S. Cl.
CPC ....... *H04L 41/5025* (2013.01); *H04B 10/032* (2013.01); *H04L 41/5048* (2013.01); *H04Q 11/0066* (2013.01); *H04L 41/0663* (2013.01); *H04L 41/0896* (2013.01); *H04L 41/12* (2013.01); *H04L 45/28* (2013.01); *H04L 45/64* (2013.01); *H04Q 2011/009* (2013.01);

(Continued)

(58) Field of Classification Search
None
See application file for complete search history.

(56) References Cited

U.S. PATENT DOCUMENTS

| | | | |
|---|---|---|---|
| 6,940,808 B1 * | 9/2005 | Shields | H04J 3/085 370/216 |
| 6,996,342 B2 * | 2/2006 | Park | H04J 14/0227 398/175 |

(Continued)

OTHER PUBLICATIONS

Ceccarelli et al., Framework for Abstraction and Control of TE Networks (ACTN), Aug. 2018, IETF Datatracker, retrieved from https://datatracker.ietf.org/doc/rfc8453/ on Oct. 3, 2019.

(Continued)

*Primary Examiner* — Jai M Lee
(74) *Attorney, Agent, or Firm* — BCF LLP

(57) ABSTRACT

The disclosed systems, structures, and methods are directed to a method for embedding the virtual network onto the elastic optical network comprising embedding the plurality of virtual nodes onto the plurality of substrate optical nodes in accordance with the plurality of location constraints provisioning the primary bandwidth demand associated with one of the plurality of virtual links connecting a source virtual node to a destination virtual node onto a plurality of disjoint substrate paths connecting a source substrate optical node and a destination substrate optical node, and embedding the one of the plurality of virtual links connecting the source virtual node to the destination virtual node onto the plurality of disjoint substrate paths connecting the source substrate optical node and the destination substrate optical node.

22 Claims, 16 Drawing Sheets

(52) U.S. Cl.
CPC ............... *H04Q 2011/0081* (2013.01); *H04Q 2011/0084* (2013.01); *H04Q 2011/0086* (2013.01)

(56) References Cited

U.S. PATENT DOCUMENTS

| | | | | |
|---|---|---|---|---|
| 10,097,376 | B2* | 10/2018 | Wang | H04L 41/0896 |
| 2002/0191247 | A1* | 12/2002 | Lu | H04B 10/03 |
| | | | | 398/79 |
| 2009/0274464 | A1* | 11/2009 | Zi | H04B 10/2507 |
| | | | | 398/79 |
| 2012/0017110 | A1* | 1/2012 | Omar | H04L 47/70 |
| | | | | 714/2 |
| 2012/0026886 | A1* | 2/2012 | Wang | H04J 3/1611 |
| | | | | 370/238 |
| 2014/0093231 | A1* | 4/2014 | Fisher | H04B 10/03 |
| | | | | 398/2 |
| 2014/0099119 | A1* | 4/2014 | Wei | H04J 14/0227 |
| | | | | 398/79 |
| 2014/0379926 | A1* | 12/2014 | Patel | H04Q 11/0001 |
| | | | | 709/226 |
| 2015/0032871 | A1* | 1/2015 | Allan | H04L 47/125 |
| | | | | 709/223 |
| 2015/0063802 | A1* | 3/2015 | Bahadur | H04L 45/125 |
| | | | | 398/49 |
| 2015/0200838 | A1* | 7/2015 | Nadeau | H04B 10/27 |
| | | | | 398/58 |
| 2015/0244453 | A1* | 8/2015 | Bottari | H04B 10/2575 |
| | | | | 398/5 |
| 2016/0211988 | A1* | 7/2016 | Lucas | H04L 45/22 |
| 2017/0047999 | A1* | 2/2017 | Wei | H04L 41/12 |
| 2017/0078152 | A1* | 3/2017 | Ahmed | H04L 12/4641 |
| 2017/0093487 | A1* | 3/2017 | Grammel | H04B 10/038 |
| 2017/0104525 | A1* | 4/2017 | Prakash | H04B 10/27 |
| 2017/0366269 | A1* | 12/2017 | Lu | H04L 45/62 |
| 2018/0152361 | A1* | 5/2018 | Chu | H04L 12/44 |
| 2019/0166039 | A1* | 5/2019 | Wen | H04L 45/12 |

OTHER PUBLICATIONS

Trowbridge et al., Flex Ethernet 2.0 Implementation Agreement, Jun. 22, 2018, Optical Internetworking Forum, retrieved from https://www.oiforum.com/wp-content/uploads/2019/01/OIF-FLEXE-02.0-1.pdf on Oct. 3, 2019.

Parvez et al., A Survey on Low Latency Towards 5G: RAN, Core Network and Caching Solutions, IEEE Communications Surveys & Tutorials, vol. 20, No. 4, Fourth Quarter 2018, pp. 3098-3130.

Shahriar et al., Achieving a Fully-Flexible Virtual Network Embedding in Elastic Optical Networks, IEEE Infocom, Paris, France, 2019, pp. 1756-1764.

Cholda et al., A Survey of Resilience Differentiation Frameworks in Communication Networks, IEEE Communications Surveys & Tutorials, 4th Quarter, 2007, Vo. 9, No. 4, pp. 32-55.

\* cited by examiner

METHOD AND SYSTEM FOR RELIABILITY-AWARE EMBEDDING OF A VIRTUAL NETWORK ONTO AN ELASTIC OPTICAL NETWORK

CROSS-REFERENCE TO RELATED APPLICATIONS

This is the first application filed for the instantly disclosed technology.

FIELD OF THE INVENTION

The present disclosure generally relates to the field of optical communication networks and, in particular, to methods and systems for reliability-aware embedding of a virtual network onto an elastic optical network.

BACKGROUND

Conventional optical networks based on Dense Wavelength Division Multiplexing (DWDM) are capable of providing bandwidth up to 4.4 THz. Such networks generally employ fixed-grid spectrums and fixed-rate transceivers. In a fixed-grid spectrum, blocks of 50 or 100 GHz of spectrum are allocated to a channel. If more spectrum is needed, multiple channels can be allocated, but it is left to a higher level network layer to link the channels together as a logical entity. Thus, a 51 GHz channel would have to be assigned a 100 GHz spectral allocation making deployment inefficient. This makes fixed-grid DWDM implementations inefficient at handling heterogeneous and variable traffic demands. In order to cater to the increasingly dynamic traffic demands, current technology is shifting towards using flex-grid spectrums for optical networks. In a flex-grid optical network, frequency allocations are more granular. Frequency can be allocated in blocks of 12.5 GHz, and there is no limitation on the number of 12.5 GHz blocks that can be allocated to a channel As such, flex-grid-based optical networks provide an effective way of increasing network-level operational efficiency by allowing the possibility of per-link bandwidth allocation in granular frequency slots as small as 12.5 GHz rather than the more monolithic 50 or 100 GHz per link as in case of legacy International Telecommunication Union (ITU) grid sizes.

Further, combining the flex-grid-based optical networks with adaptive modulation and coding capabilities of flex-rate optical transceiver results in a concept of elastic optical networks (EONs). The concept of EONs is transforming existing optical networks with its inherent capability of dynamic resource allocation in mesh-like optical networks to address dynamic, diverse and bursty traffic demands. As such, EONs are capable of allocating variable number of frequency slots to right size the spectrum allocation to customer needs. Along with the advances in coherent-transmission technology EONs allow the tuning of transmission parameters such as baud rate, modulation format and forward error correction (FEC) overhead.

Transport networks employing the latest advances in optical networks are likely to form the backbone of the fifth generation (5G) wireless networks. The use of virtualized functions, and virtual links to create a 5G core network, as well as the expected dynamic data demands of such as network call for transport networks that can be expanded dynamically to support flexible capacities. An EON can address some of the needs generated by 5G core networks such as those intended to support enhanced mobile broadband and ultra-reliable low latency communications. To this end, EONs are an excellent choice for establishing transport network frequency slots, with their ability to tailor network resources based on service requirements.

Network slices can be provided in the form of virtual networks (VNs) each composed of its own set of virtual nodes and virtual links embedded in (or instantiated upon the resources of) the underlying optical SNs. Each SN can comprise optical nodes and substrate optical links, and may be owned by a different network operator than the next SN. Each network slice can be managed and operated by service providers, forming a two-tier architecture. According to ACTN framework (IETF RFC8453), these VNs can be used to host virtual network services (VNSs), requested by enterprise customers.

These VNs are anticipated to be used to host services running at hundreds of Gigabits per second (Gbps) line rate. As a consequence, even a short-lived network outage can cause a significant traffic disruption in these slices. However, ensuring reliability of network slices is non-trivial as failures in a transport network, such as transponder failure and fibre cuts, are still the norm.

In some previous approaches to reliability pre-provisioning of a dedicated backup path to each path used for embedding the VLinks, also known as dedicated protection, has been suggested. Although dedicated backup paths can allow fast fail-over switching within milliseconds, they incur a significant resource overhead since they remain idle during failure-free operations.

A challenge in instantiating VNs in support of applications requiring reliability is to provide a mechanism for efficient mapping of VN nodes and links on the optical SN, also known as Virtual Network Embedding (VNE), which minimizes SN resource consumption while satisfying the dedicated protection but also minimizes the optical SN resource consumption. Typically, VNE with dedicated protections has been extensively studied using fixed grid network with a fixed transceiver data rate. The problem of VNE over EON, accounting for reliability, although crucial to the efficient functioning of next-generation networks, has received very less attention heretofore for elastic optical networks.

Consequently, as part of the reliability requirements of various emerging user applications including those enabled by 5G, there is a pressing need for solutions and algorithms for resource allocation and virtualization of optical transport networks that are capable of ensuring reliable VNSs based on the Service Level Agreement (SLA).

SUMMARY

An object of the present disclosure is to provide a method for reliability-aware virtual network embedding onto an elastic optical network comprising a plurality of substrate optical nodes and a plurality of substrate optical links connecting the substrate optical nodes, the method comprising receiving a virtual network topology and virtual network constraints, associated with the virtual network, for embedding onto the elastic optical network, the virtual network topology comprising a plurality of virtual nodes, a plurality of virtual links connecting the virtual nodes, a primary bandwidth demand associated with each of the plurality of virtual links, the virtual network constraints comprising a plurality of location constraints associated with the plurality of virtual nodes, each location constraint providing an indication of at least one of the plurality of substrate optical nodes onto which one of the plurality of virtual nodes can be embed, a bandwidth squeezing rate (BSR) associated with the plurality of virtual links connecting the plurality of virtual nodes, embedding the virtual network onto the elastic optical network comprising, embedding the plurality of virtual nodes onto the plurality of substrate optical nodes in accordance with the plurality of location constraints, provisioning the primary bandwidth demand associated with one of the plurality of virtual links connecting a source virtual node to a destination virtual node onto a plurality of disjoint substrate paths connecting a source substrate optical node and a destination substrate optical node, wherein, the provisioning of the primary bandwidth demand is performed in such a manner that in case of failure of one of the plurality of disjoint substrate paths, a total bandwidth associated with the remaining plurality of disjoint substrate paths is at least equal to BSR times the primary bandwidth demand, embedding the one of the plurality of virtual links connecting the source virtual node to the destination virtual node onto the plurality of disjoint substrate paths connecting the source substrate optical node and the destination substrate optical node.

In accordance with other aspects of the present disclosure, the method, wherein the BSR times the primary bandwidth demand is less than or equal to the primary bandwidth demand.

In accordance with other aspects of the present disclosure, the method, further comprising allocating frequency slots to the plurality of disjoint substrate paths wherein allocating frequency slots comprises allocating same contiguous set of frequency slots to all of the plurality of disjoint substrate paths connecting the source substrate optical node and the destination substrate optical node.

In accordance with other aspects of the present disclosure, the method, wherein the provisioning of the primary bandwidth demand further comprises splitting the primary bandwidth demand associated with one of the plurality of virtual links connecting the source virtual node to the destination virtual node onto the plurality of disjoint substrate paths connecting the source substrate optical node and the destination substrate optical node.

In accordance with other aspects of the present disclosure, the method, further comprising determining the embedding of the virtual network using an integer linear programming (ILP) formulation.

In accordance with other aspects of the present disclosure, the method, wherein an objective function associated with the ILP formulation is given by $$\text{minimize} \left( \sum_{\forall \bar{e} \in E} \sum_{\forall p \in P_{\bar{e}}^k} \sum_{\forall t \in T_{\bar{e}p}} \sum_{i=1}^{q} \sum_{\forall s \in S} y_{\bar{e}ptis} \times |p| + \varepsilon \sum_{\forall \bar{e} \in E} \sum_{\forall p \in P_{\bar{e}}^k} \sum_{\forall t \in T_{\bar{e}p}} \sum_{i=1}^{q} w_{\bar{e}pti} \right),$$

where $\bar{E}$ is a set individual virtual links $\bar{e}$, $Pk/e$ is a set of k shortest substrate paths connecting the source substrate optical node and the destination substrate optical node for each virtual link $\bar{e} \in \bar{E}$, $T_{\bar{e}p}$ is a set of admissible transmission configurations t, q is a maximum number of allowable splits in the one of the k shortest substrate paths, S is a set of equal-width frequency slots s, $|p|$ is a total number of the plurality of substrate optical links associated with the one of the plurality of substrate paths p, $\varepsilon$ is selected in a manner that the second term in the objective function is effective only when multiple solutions have same value as first term, $y_{\bar{e}ptis}$ is a relationship between the one of the k shortest substrate paths, frequency slots s associated with the plurality of substrate optical links between the one of the k shortest substrate paths, one of the virtual links $\bar{e}$, one of the admissible transmission configurations t, and one of the allowable splits and $w_{\bar{e}pti}$ is a relationship between the one of the k shortest substrate paths, one of the virtual links $\bar{e}$, one of the admissible transmission configurations t, and one of the allowable splits.

In accordance with other aspects of the present disclosure, the method, wherein $y_{\bar{e}ptis}$ is given by:

$$y_{eptis} = \begin{cases} 1 & \text{if } \bar{e} \in \bar{E} \text{ uses } s \in S \text{ on path } p \in P_{\bar{e}}^k \text{ with the } i\text{-th instance of } t \in T_{\bar{e}p} \\ 0 & \text{Otherwise} \end{cases}.$$

In accordance with other aspects of the present disclosure, the method, wherein $w_{\bar{e}pti}$ $$\text{given by } w_{epti} = \begin{cases} 1 & \text{if } \bar{e} \in \bar{E} \text{ uses } i\text{-th instance of } t \in T_{\bar{e}p} \text{ on path } p \in P_{\bar{e}}^k \\ 0 & \text{Otherwise} \end{cases}.$$

In accordance with other aspects of the present disclosure, the method, wherein each of the admissible transmission configuration t is comprising of a specific baud-rate b, a modulation format m and a forward error correction code (FEC) overhead f.

In accordance with other aspects of the present disclosure, the method, further comprising determining the embedding of the virtual network using a heuristic approach.

In accordance with other aspects of the present disclosure, the method, wherein the heuristic approach further comprises ordering the plurality of virtual links in accordance with the availability of contiguous frequency slots in candidate substrate path sets associated with the plurality of disjoint substrate paths, computing a multi-set of the plurality of disjoint substrate paths and their respective transmission configuration permutations connecting the source virtual node and the destination virtual node in accordance with the ordering of the plurality of virtual links, allocating frequency slots to the plurality of disjoint substrate paths connecting the source virtual node and the destination virtual node, and selecting a plurality of substrate paths from the multi-set of the plurality of disjoint substrate paths requiring minimum number of frequency slots to provision the primary bandwidth as well as BSR times the primary bandwidth demand in case of failure of one of the plurality of disjoint substrate paths.

In accordance with other aspects of the present disclosure, the method, wherein the ordering of the plurality of virtual links is performed in terms of commonality of substrate links associated with the plurality of disjoint substrate paths which are associated with the plurality of virtual links.

In accordance with other aspects of the present disclosure, the method, further comprising constructing an auxiliary graph to analyze commonality of substrate links.

In accordance with other aspects of the present disclosure, the method, wherein one of the candidate substrate path sets comprises k shortest disjoint substrate paths connecting the source substrate optical node and the destination substrate optical node.

In accordance with other aspects of the present disclosure, there is provided a system for reliability-aware virtual network embedding onto a substrate optical network comprising a plurality of substrate nodes and a plurality of substrate links connecting the substrate nodes, the system comprising a processing unit for executing instructions, and a memory unit for storing instructions, which when executed by the processor configure the system to perform steps for receiving a virtual network topology and virtual network constraints, associated with the virtual network, for embedding onto the elastic optical network, the virtual network topology comprising a plurality of virtual nodes, a plurality of virtual links connecting the virtual nodes, a primary bandwidth demand associated with each of the plurality of virtual links, the virtual network constraints comprising a plurality of location constraints associated with the plurality of virtual nodes, each location constraint providing an indication of at least one of the plurality of substrate optical nodes onto which one of the plurality of virtual nodes can be embed, a bandwidth squeezing rate (BSR) associated with the plurality of virtual links connecting the plurality of virtual nodes, embedding the virtual network onto the elastic optical network comprising, embedding the plurality of virtual nodes onto the plurality of substrate optical nodes in accordance with the plurality of location constraints, provisioning the primary bandwidth demand associated with one of the plurality of virtual links connecting a source virtual node to a destination virtual node onto a plurality of disjoint substrate paths connecting a source substrate optical node and a destination substrate optical node, wherein, the provisioning of the primary bandwidth demand is performed in such a manner that in case of failure of one of the plurality of disjoint substrate paths, a total bandwidth associated with the remaining plurality of disjoint substrate paths is at least equal to BSR times the primary bandwidth demand, embedding the one of the plurality of virtual links connecting the source virtual node to the destination virtual node onto the plurality of disjoint substrate paths connecting the source substrate optical node and the destination substrate optical node.

In accordance with other aspects of the present disclosure, the system, further comprising allocating frequency slots to the plurality of disjoint substrate paths wherein allocating frequency slots comprises allocating same contiguous set of frequency slots to all of the plurality of disjoint substrate paths connecting the source substrate optical node and the destination substrate optical node.

In accordance with other aspects of the present disclosure, the system, wherein the provisioning of the primary bandwidth demand further comprises splitting the primary bandwidth demand associated with one of the plurality of virtual links connecting the source virtual node to the destination virtual node onto the plurality of disjoint substrate paths connecting the source substrate optical node and the destination substrate optical node.

In accordance with other aspects of the present disclosure, the system, further comprising determining the embedding of the virtual network using an integer linear programming (ILP) formulation.

In accordance with other aspects of the present disclosure, the system, wherein an objective function associated with the ILP formulation is given by:

$$\text{minimize}\left(\sum_{\forall e \in E} \sum_{\forall p \in P_{\bar{e}}^k} \sum_{\forall t \in T_{ep}} \sum_{i=1}^{q} \sum_{\forall s \in S} y_{\bar{e}ptis} \times |p| + \varepsilon \sum_{\forall e \in E} \sum_{\forall p \in P_{\bar{e}}^k} \sum_{\forall t \in T_{ep}} \sum_{i=1}^{q} w_{\bar{e}pti}\right),$$

where $\bar{E}$ is a set individual virtual links $\bar{e}$, $P_{\bar{e}}^k$ is a set of k shortest substrate paths connecting the source substrate optical node and the destination substrate optical node for each virtual link $\bar{e} \in \bar{E}$, $T_{\bar{e}p}$ is a set of admissible transmission configurations t, q is a maximum number of allowable splits in the one of the k shortest substrate paths, S is a set of equal-width frequency slots s, |p| is a total number of the plurality of substrate optical links associated with the one of the plurality of substrate paths p, $\varepsilon$ is selected in a manner that the second term in the objective function is effective only when multiple solutions have same value as first term, $y_{\bar{e}ptis}$ is a relationship between the one of the k shortest substrate paths, frequency slots s associated with the plurality of substrate optical links between the one of the k shortest substrate paths, one of the virtual links $\bar{e}$, one of the admissible transmission configurations t, and one of the allowable splits and $w_{\bar{e}pti}$ is a relationship between the one of the k shortest substrate paths, one of the virtual links $\bar{e}$, one of the admissible transmission configurations t, and one of the allowable splits.

In accordance with other aspects of the present disclosure, the system, wherein each of the admissible transmission configuration t is comprising of a specific baud-rate b, a modulation format m and a forward error correction code (FEC) overhead f.

In accordance with other aspects of the present disclosure, the system, further comprising determining the embedding of the virtual network using a heuristic approach.

In accordance with other aspects of the present disclosure, the system, wherein the heuristic approach further comprises ordering the plurality of virtual links in accordance with the availability of contiguous frequency slots in candidate substrate path sets associated with the plurality of disjoint substrate paths, computing a multi-set of the plurality of disjoint substrate paths and their respective transmission configuration permutations connecting the source virtual node and the destination virtual node in accordance with the ordering of the plurality of virtual links, allocating frequency slots to the plurality of disjoint substrate paths connecting the source virtual node and the destination virtual node, and selecting a plurality of substrate paths from the multi-set of the plurality of disjoint substrate paths requiring minimum number of frequency slots to provision the primary bandwidth as well as BSR times the primary bandwidth demand in case of failure of one of the plurality of disjoint substrate paths.

BRIEF DESCRIPTION OF THE FIGURES

The features and advantages of the present disclosure will become apparent from the following detailed description, taken in combination with the appended drawings, in which.

Figure 1:
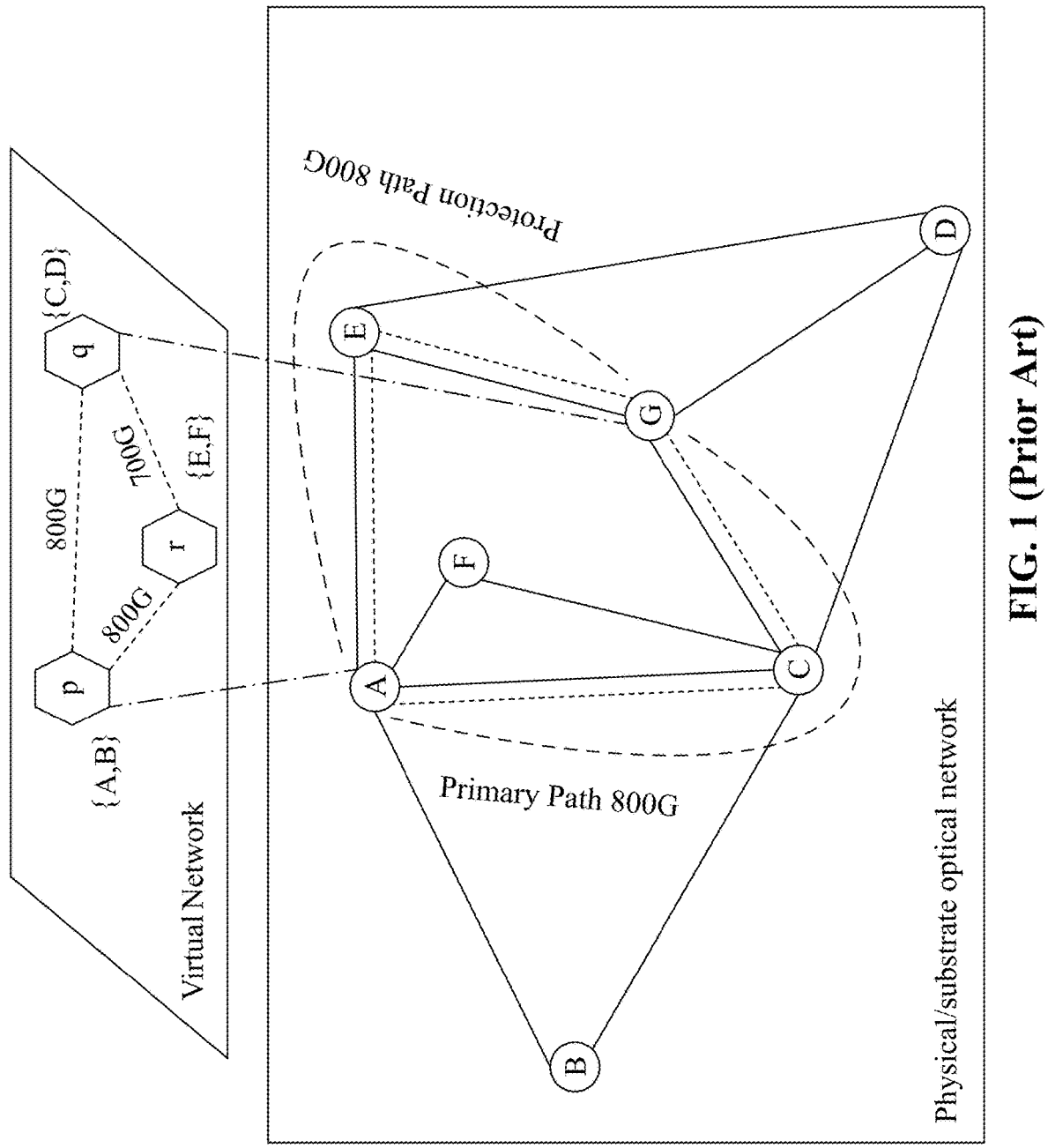
FIG. 1 depicts a physical optical network corresponding to a conventional dedicated protection based virtual network embedding.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

Unless otherwise defined, all technical and scientific terms used herein have the same meaning as commonly understood by one of ordinary skill in the art to which the described embodiments appertain to.

FIG. 1 is a block diagram illustrating a physical optical network corresponding to a conventional dedicated protection based virtual network embedding. A virtual network comprising virtual nodes p, q, and r is to be instantiated upon a physical/substrate optical network comprising of substrate optical nodes A, B, C, D, E, F, and G. The location constraints associated with the virtual node p are limit its placement to one of substrate optical nodes A and B, the location constraints associated with the virtual node q are substrate optical nodes F and G, and the location constraints associated with the virtual node r are substrate optical nodes E and F. That is, to embed the virtual network over the physical/substrate optical network, the virtual node p can only be mapped to substrate optical nodes A and B, the virtual node q can only be mapped to substrate optical nodes F and G and the virtual node r can only be mapped to substrate optical nodes E and F. There may be a number of reasons for such location constraints, but they are typically business decisions or are based on the availability of specific hardware, regardless of the reasons, the location constraints cannot typically be ignored.

Further, the bandwidth demand associated with the virtual link between virtual nodes p and q, o and r, and q and r are 800 Gbps, 800 Gbps, and 700 Gbps respectively. As an example, in order to embed the virtual link between virtual nodes p and q using conventional dedicated protection, the virtual node p is mapped to the substrate optical node A and the virtual node q is mapped to substrate optical node G. The primary substrate path provisioning the virtual link is through substrate optical nodes A, C and G with associated path bandwidth of 800 Gbps. In order to provide protection against a substrate link failure a dedicated protection path (disjoint from the primary substrate path) is provisioned through substrate optical nodes A, E, and G with associated path bandwidth of 800 Gbps.

In this manner, in case of a substrate link failure in the actual substrate path, the associated data traffic can be diverted over dedicated protection path. However, the total bandwidth required using the conventional dedicated protection based virtual network embedding is twice the bandwidth demand associated with the virtual link. Moreover, the conventional dedicated protection based virtual network embedding has been implemented over fixed grid networks. Hence, there is a requirement for efficient and reliability-aware virtual network embedding technique that is capable of utilizing the flexibility of elastic optical network while reducing the total bandwidth requirement to embed the virtual network.

Figure 2:
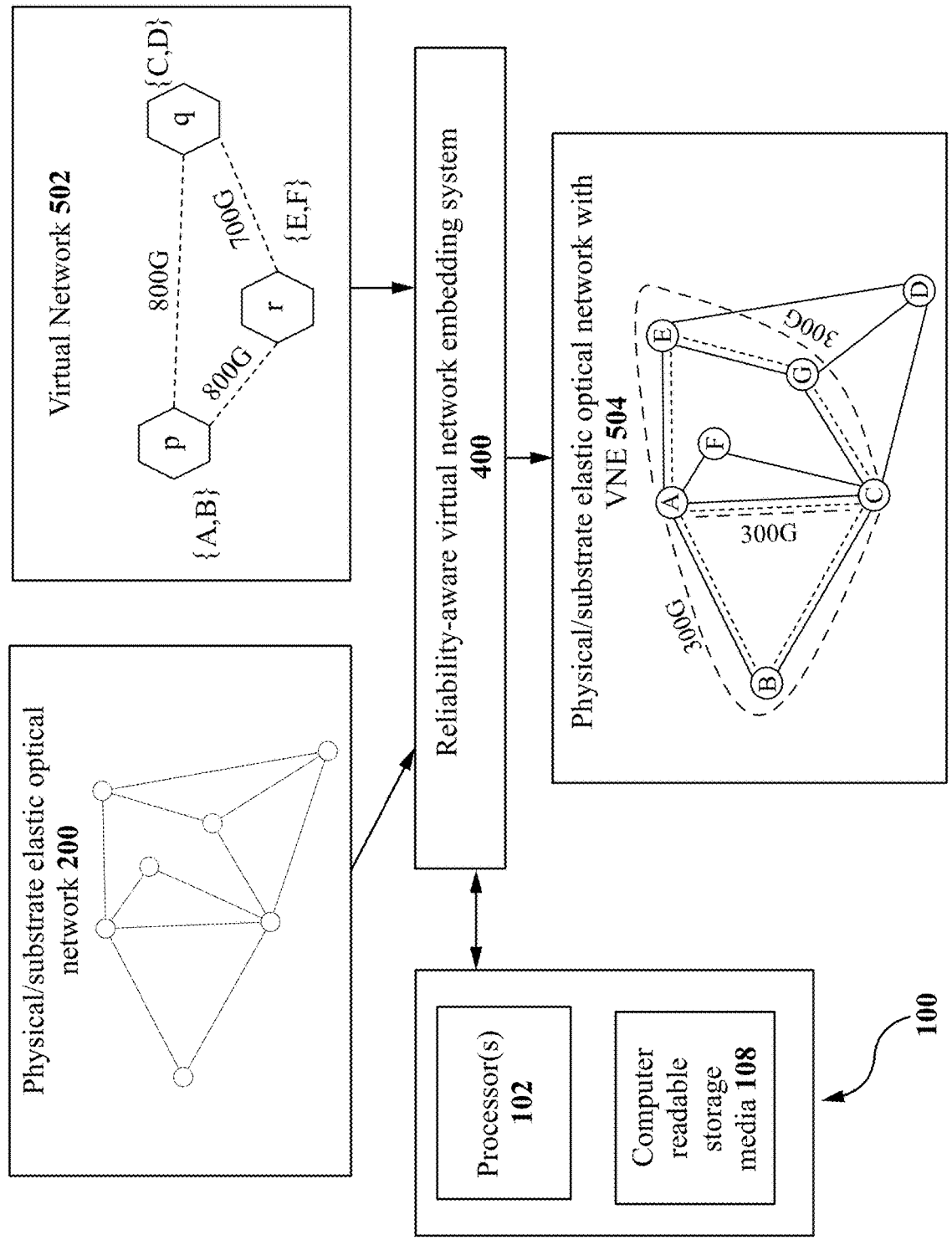
FIG. 2 depicts a high-level functional block diagram of a system, in accordance with various embodiments of present disclosure.

With this said, FIG. 2 is a high-level block functional block diagram of an embodiment of a system 100 configured to implement reliability-aware virtual network embedding physical/substrate elastic optical network. As shown, a reliability-aware virtual network embedding system 400 may be configured to receive a request for instantiation of a virtual network associated with a virtual network 502 to be embedded on a physical/substrate elastic optical network (SN) 200. The reliability-aware virtual network embedding system 400 may perform virtual network embedding (VNE) as illustrated by physical/substrate elastic optical network with VNE 504. It is to be noted that SN 200 and the physical/substrate elastic optical network with VNE 504 are the same network; however the latter is merely illustrated with VNE. It will be appreciated that in certain embodiments, the reliability-aware virtual network embedding system 400 may be implemented as software executed by the system 100. In some embodiments, system 400 is a part of a network orchestrator, while in other embodiments it can be used to create instructions or a mapping provided to a network orchestrator for the purposes of instantiating a virtual network.

The system 100 may comprise one or more computing devices, represented as a single server 100. Although represented as a single server, the system 100 may be implemented as one or more real or virtual servers. As shown, the system 100 may be configured to receive a virtual network 502 to be implemented on a SN 200.

Figure 3:
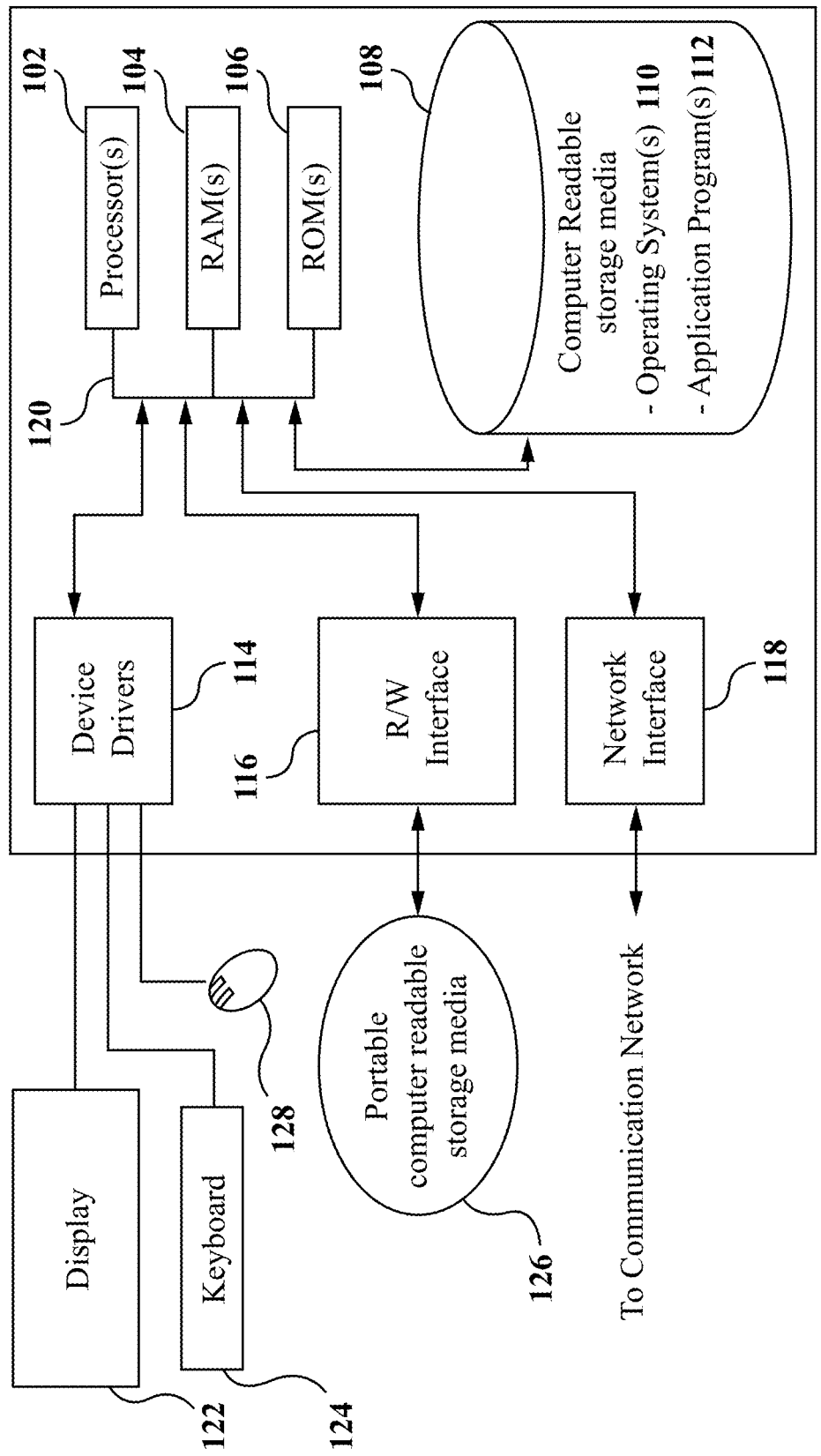
FIG. 3 depicts a high-level block diagram of representative components for the system configured to implement the reliability-aware virtual network embedding, in accordance with various embodiments of the present disclosure.

FIG. 3 depicts a high-level block diagram of representative components for the system 100 configured to implement reliability-aware virtual network embedding, in accordance with various embodiments of the present disclosure. It should be appreciated that FIG. 3 provides only an illustration of one implementation of the system 100 and does not imply any limitations with regard to the environments in which different embodiments may be implemented. Many modifications to the depicted environment can be done to implement the system 100 without departing from the principles presented herein.

As shown, the system 100 employs one or more processors 102, one or more computer-readable random access memories (RAMs) 104, one or more computer-readable read only memories (ROMs) 106, one or more computer-readable storage media 108, device drivers 114, a read/write (R/W) interface 116, a network interface 118, all interconnected over a communications fabric 120. The communication fabric 120 may be implemented with any architecture designed for passing data and/or control information between processors (such as microprocessors, communications and network processors, etc.), memory, peripheral devices, and any other hardware components within a system.

The one or more operating system(s) 110 and the one or more application program(s) 112 are stored on one or more of the computer-readable storage media 108 for execution by the one or more of the processors 102 via the one or more of the respective RAMs 104 (which typically include a cache memory). In the illustrated embodiment, each of the computer-readable storage media 108 may be a magnetic disk storage device of an internal hard drive, CD-ROM, DVD, memory stick, magnetic tape, magnetic disk, optical disc, a semiconductor storage device such as RAM, ROM, EPROM, flash memory or any other computer-readable tangible storage device that can store a computer program and digital information.

The system 100 may also include the R/W drive or interface 116 to read from and write to one or more portable computer readable storage media 126. Application programs 112 on said devices may be stored on one or more of the portable computer readable storage media 126, read via the respective R/W drive or interface 116 and loaded into the respective computer readable storage media 108.

It will be appreciated that in certain embodiments the application programs 112 stored on one or more of the portable computer readable storage media 126 may configure the system 100 to provide reliable VNE functionality. Broadly, the VNE functionality may receive a virtual network 300 (discussed below) and determine various possibilities to map the virtual network 300 (discussed below) to a SN 200 (discussed below). Once an optimal solution to map the virtual network 300 (discussed below) is determined, the mapping may be embedded on the SN 200 (discussed below) to implement the virtual network 300 (discussed below).

The application programs 112 on the said system 100 may be downloaded to the system 100 from an external computer or external storage device via a communication network (for example, the Internet, a local area network or other wide area network or wireless network) and network interface 118. From the network interface 118, the programs may be loaded onto computer-readable storage media 108.

The system 100 may also include a display screen 122, a keyboard or keypad 124, and a computer mouse or touchpad 128. The device drivers 114 may interface to display screen 122 for imaging, to keyboard or keypad 124, to a computer mouse or touchpad 128, and/or to display screen 122 (in case of touch-screen display) for pressure sensing of alphanumeric character entry and user selections. The device drivers 114, R/W interface 116 and network interface 118 may comprise hardware and software (stored on computer-readable storage media 108 and/or ROM 106).

The programs described herein are identified based upon the application for which they are implemented in a particular embodiment of the present disclosure. However, it should be appreciated that any particular program nomenclature herein is used merely for convenience, and thus the disclosure should not be limited to use solely in any specific application identified and/or implied by such nomenclature.

It will be appreciated that the system 100 may be a server, a desktop computer, a laptop computer, a tablet, a smartphone, a personal digital assistant or any device that may be configured to implement the present technology, as should be understood by a person skilled in the art.

Based on the foregoing, a system and a method has been disclosed. However, numerous modifications and substitutions can be made without deviating from the scope of the present invention. Therefore, the present invention has been disclosed by way of example and not limitations.

Figure 4:
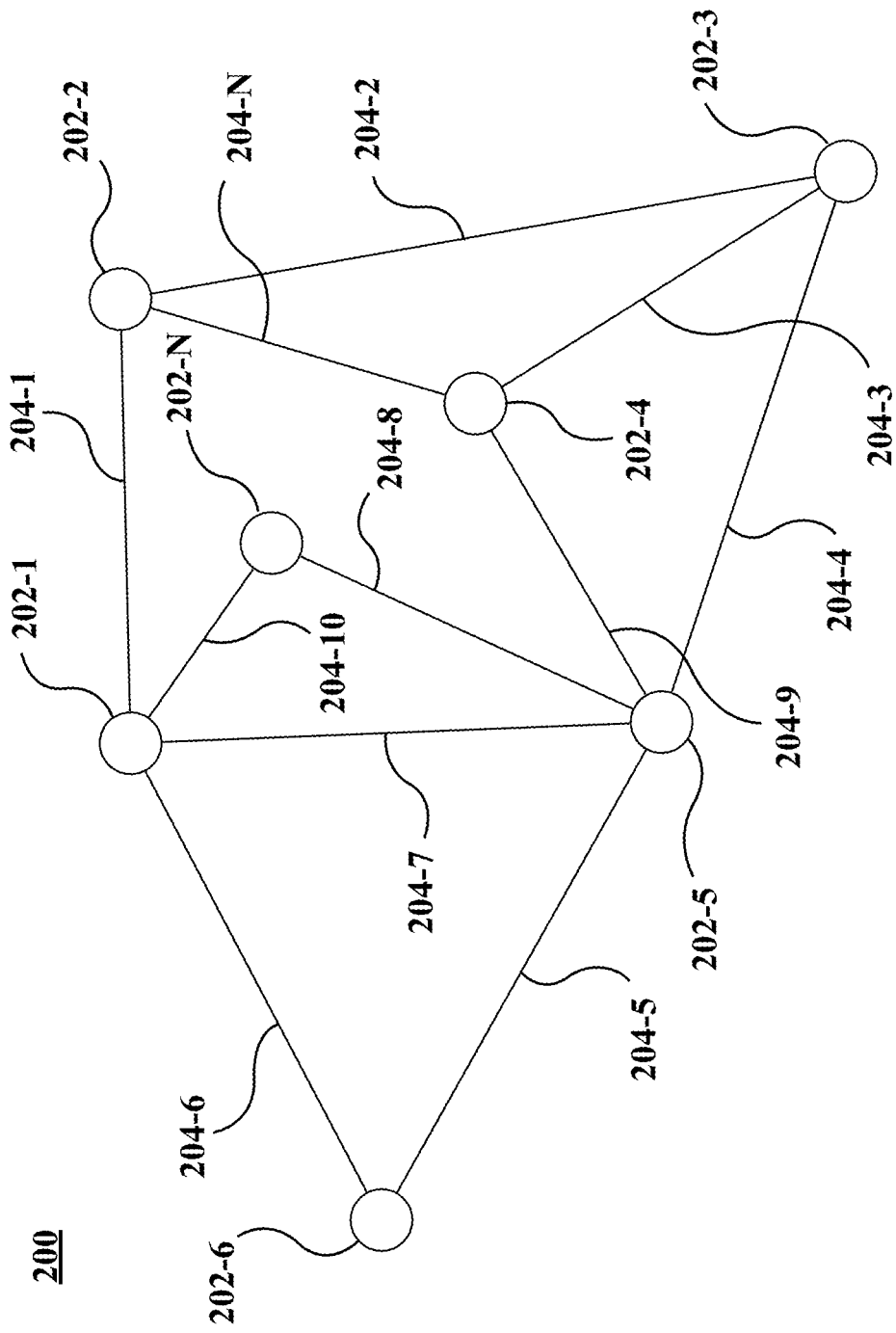
FIG. 4 illustrates a representative example of a physical/substrate elastic optical network (SN), in accordance with various aspects of present disclosure.

FIG. 4 illustrates a representative example of the SN 200, in accordance with various aspects of present disclosure. It is to be noted that in certain embodiments, the SN 200 may be an undirected graph G=(V, E), where V is a set of substrate optical nodes (SNodes) 202-1, 202-2 . . . 202-N and and E is a set of substrate optical links (SLinks) 204-1, 204-2 . . . 204-N. Without loss of generality, it has been assumed the set of SNodes 202-1, 202-2 . . . 202-N is colorless, directionless, and contentionless. Further, the set of SLinks 204-1, 204-2 . . . 204-N may be bidirectional, i.e., adjacent SNodes (e.g. SNodes 202-1 and 202-2) may be connected by one optical fiber in each direction (not shown).

Because, SN 200 is based on elastic optical network (EON), the usable optical spectrum on each SLink e=(u, v)∈E may be divided into equal-width frequency slots represented by the set S and enumerated as 1, 2 . . . |S|, where u and v may be two SNodes (e.g. SNodes 202-1 and 202-2) connected by a SLink (e.g. SLink 204-1). Also, each of the SLink has an associated bandwidth capacity, which may differ from link to link. In addition to the bandwidth capacity, each link also has an associated cost for providing a unit of bandwidth.

Further, P represents a set of all possible paths in the undirected graph G=(V, E) and $P_{uv}^k \subset P$ represents a subset of P comprising the k-shortest paths between SNodes u, v∈V, respectively. The two endpoints of a substrate path (SPath) p∈P may be represented as src(p) and dst(p). The number of SLinks and the physical length of the SPath p in kilometers are represented as |p| and len(p) respectively. For example, in FIG. 4, SNodes 202-1 and 202-3 may be treated as endpoints of the SPath p∈P with two SLinks 204-4 and 204-7 in SPath p∈P. Also a binary variable $\delta_{pe}$ may denote the association between a SPath p∈P and any link e∈E.

In certain embodiments, in order to enable data transmissions with different data rates d∈D, the system 100 may configure the transmission parameters on the path p with physical length len(p) with various parameters. Such parameters include baud-rate or symbol rate b, modulation format m (e.g. QPSK, 16 QAM, 32 QAM etc.), forward error correction code (FEC) overhead, f selected from a set of possible values of baud-rates or symbol rates B, modulation formats M and FEC overheads F. A tuple t=(d, b, m, f)∈T=(D, B, M, F) may be used to represent a transmission configuration that dictates the combination b∈B, m∈M, and f∈F that can be used to yield the data rate d∈D. For the sake of representation $t^{(d)}$, $t^{(b)}$, $t^{(m)}$ and $t^{(f)}$ may be used to denote the data rate, baud-rate, modulation format, and FEC overhead of a configuration t∈T, respectively.

In certain embodiments, based on physical layer characteristics, the system 100 may also compute a reach table R, specifying the maximum length of the SPath p (i.e., the reach $r_t$) capable of maintaining a satisfactory optical signal to noise ratio (SNR) when configured according to a transmission configuration $t \in T$. Finally, $n_t$ denotes the number of frequency slots required to accommodate a transmission configuration $t \in T$, which may depend on the parameters of t. Table 1 depicts a representative example of the reach table R, in accordance with various aspects of present disclosure.

TABLE 1

| Data Rates D (Gbps) | Modulation Formats M | FEC Overheads F (%) | Spectral Bandwidth (GHz) | Reach rt (km) |
|---|---|---|---|---|
| 100 | QPSK | 25% | 50 | 2000 |
|  | 16QAM | 20% | 25 | 1250 |
| 200 | QPSK | 25% | 75 | 1000 |
|  | 32QAM | 20% | 37.5 | 400 |

Figure 5:
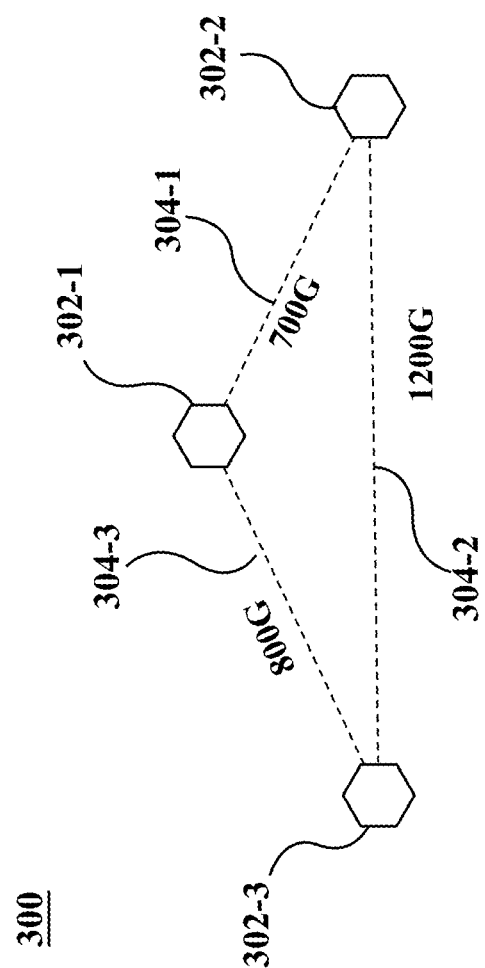
FIG. 5 illustrates a representative example of a virtual network, in accordance with various aspects of present disclosure.

FIG. 5 illustrates a representative example of a virtual network 300, in accordance with various aspects of present disclosure. It is to be noted that in certain embodiments, the virtual network may be an undirected graph $\overline{G}=(\overline{V}, \overline{E})$, where $\overline{V}$ and $\overline{E}$ are a set of virtual nodes (VNodes) 302-1, 302-2, and 302-3 and a set of virtual links (VLinks) 304-1, 304-2 and 304-3 respectively.

As an example, virtual network 300 may describe the topology and constraints of the virtual network to be embedded onto the SN 200. As depicted, the virtual network 300 comprises three VNodes 302-1, 302-2, and 302-3 connected by Vlinks 304-1, 304-2, and 304-3 each having a different respective bandwidth requirement represented as $\overline{\beta}_{\overline{e}}$. For example, bandwidth requirements associated with the VLinks 304-1, 304-2, and 304-3 are 700 Gbps, 1200 Gbps, and 800 Gbps respectively. It is to be noted that, the virtual network 300 may include additional information associated with the location constraint set $C(\overline{u})$ for each of the VNodes 302-1, 302-2, and 302-3. For example, the location constraint set $C(\overline{u})$ for VNodes 302-1 may be {202-1, 202-2, 202-6}, indicating that VNodes 302-1 must be provisioned on one of the SNodes {202-1, 202-2, 202-6}. Similarly, the location constraint set $C(\overline{u})$ for VNodes 302-2 may be {202-2, 202-3, 202-4}, indicating that VNodes 302-2 must be provisioned on one of the SNodes {202-2, 202-3, 202-4} and the location constraint set $C(\overline{u})$ for VNodes 302-3 may be {202-4, 202-5, 202-6}, indicating that VNodes 302-3 must be provisioned on one of the SNodes {202-4, 202-5, 202-6}.

In certain embodiments, each VNode $\overline{u} \in \overline{V}$ may be associated with a location constraint set $C(\overline{u}) \subset V$ indicating the set of SNodes where $\overline{u}$ can be embedded. The system 100 may set a binary input variable $c_{\overline{u}u}$ to 1 if $u \in V$ is in the location constraint set $C(\overline{u})$, or to 0 otherwise. The endpoints of the VLink $\overline{e}=(\overline{u}, \overline{v}) \in \overline{E}$ may be denoted by $src(\overline{e})$ and $dst(\overline{e})$, where $\overline{u}$ and $\overline{v}$ maybe two VNodes (e.g. VNodes 302-1 and 302-3) connected by a VLinks (e.g. VLinks 304-1 and 304-2).

Each VLink $\overline{e} \in \overline{E}$ has a respective bandwidth requirement $\overline{\beta}_{\overline{e}}$ and a reliability requirement in term of bandwidth squeezing rate (BSR) associated with each VLink $\overline{e} \in \overline{E}$ defined as: $0 \leq BSR_{\overline{e}} \leq 100$, indicating a percentage of the original bandwidth that should be available after a SLink (e.g. SLink 204-1) fails. In certain embodiments, the system 100 may allow the Vlinks (e.g. VLinks 304-1 and 304-2) to be mapped to multiple substrate paths (SPaths), each with a lower data rate than $\overline{\beta}_{\overline{e}}$. Mapping Vlinks (e.g. VLinks 304-1 and 304-2) to multiple SPaths may assist the system 100 to overcome the problem of reach $r_t$ becoming smaller for higher data rates (as depicted by Table 1) limiting the number of usable SPaths.

However, in certain embodiments, the system 100 may put a limit on the number of VLink splits to maximum $q \geq 1$. It is understood by a person skilled in the art that, such multipath provisioning may be achieved by already known techniques such as virtual concatenation (VCAT) in Optical Transport Network (OTN) or bonding capabilities of FlexE.

Figure 6:
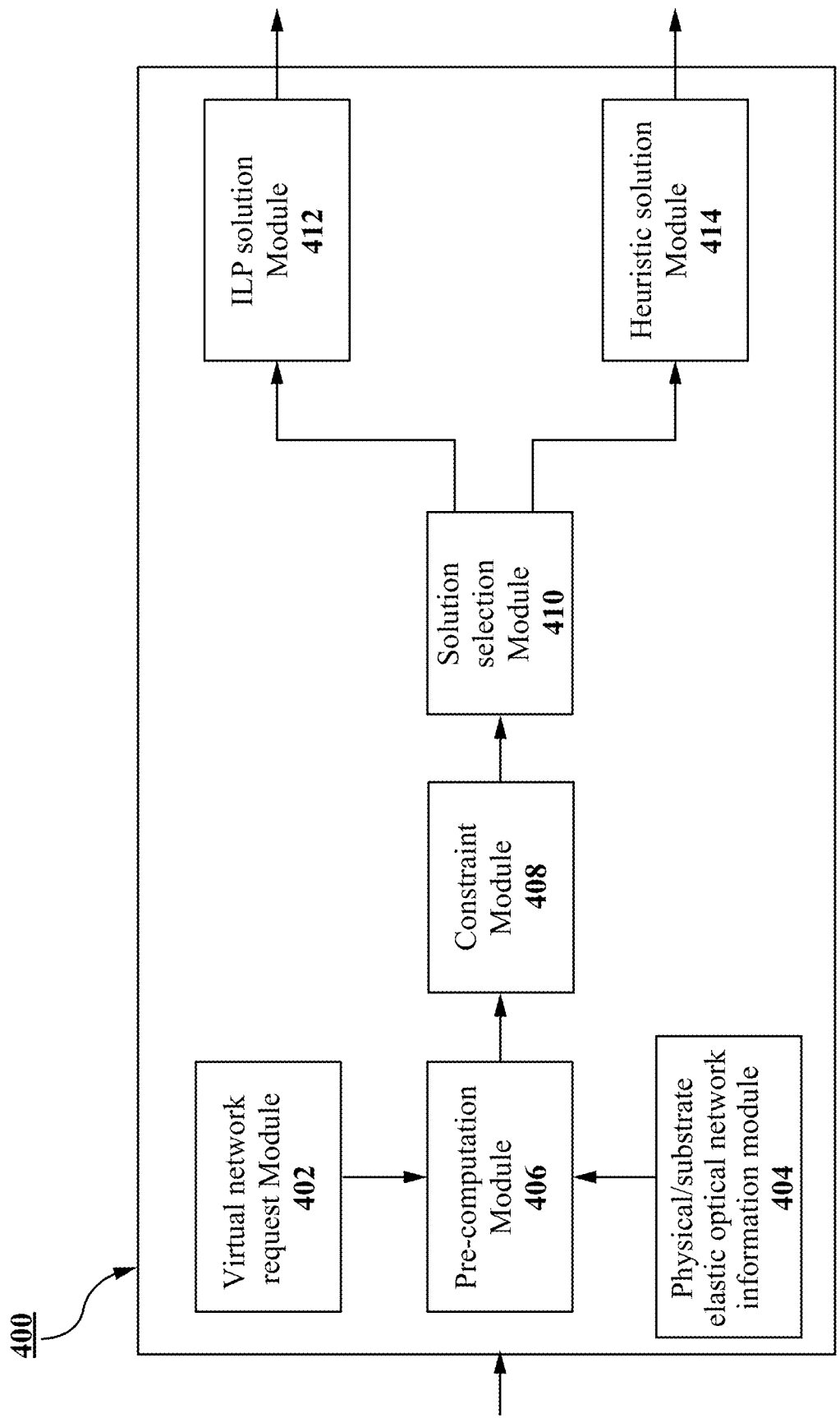
FIG. 6 illustrates a high-level functional block diagram of a reliability-aware virtual network embedding system, configured to compute disjoint substrate paths (SPaths) for embedding the virtual network onto physical/substrate elastic optical network.

FIG. 6 is a high-level functional block diagram of a reliability-aware virtual network embedding system 400, configured to compute disjoint SPaths for embedding the virtual network (e.g. virtual network 300) onto SN 200. As shown, the reliability-aware virtual network embedding system 400 comprises a virtual network request module 402, a physical/substrate elastic optical network information module 404, a pre-computation module 406, a constraint module 408, a solution selection module 410, an integer linear program (ILP) solution module 412, and a heuristic solution module 414. It is to be noted that other elements may be present, but are not illustrated for the purpose of tractability and simplicity.

In certain embodiments, the functionality of the reliability-aware virtual network embedding system 400 may be based on certain techniques in order to decrease the consumption of resources associated with the SN 200. Such techniques include bandwidth squeezing and survivable multipath provisioning. As such, bandwidth squeezing may be referred to tuning the amount of assured bandwidth in case of a SLink (e.g. SLink 204-1) is failed and survivable multipath provisioning may be referred to splitting the bandwidth demand associated with the VLink (e.g. VLink 304-1) over multiple disjoint SPaths.

Bandwidth squeezing may be motivated by a number of factors including that not all services require their full bandwidth allocation to be operational. In one example, in case of a file transfer, communication can still be operational with a reduced bandwidth during a failure of the SLink (e.g. SLink 204-1). The extent of bandwidth reduction may be measured as $0 \leq BSR_{\overline{e}} \leq 100$, indicating a percentage of original bandwidth that should be available after a SLink (e.g. SLink 204-1) fails. Further, survivable multipath provisioning explores the fact that not all of the disjoint splits belonging to the same VLink (e.g. VLink 304-1) are jointly affected by a single SLink (e.g. SLink 204-1) failure. To this end, the bandwidth associated with the surviving paths after a failure may still be to provide a bandwidth in accordance with the BSR associated with the VLink (e.g. VLink 304-1). This bandwidth squeezing may also be referred to by some people as service-based multiplexing, where the total bandwidth required to provide a set of services is less than the sum individual bandwidths assigned to the services.

In certain embodiments, the reliability-aware virtual network embedding system 400 may be configured to perform provisioning of bandwidth demand $\overline{\beta}_j$ associated the VLinks (e.g. VLink 304-1) onto a plurality of disjoint substrate paths connecting a source SNode (e.g. SNode 202-1) and a destination SNode (e.g. SNode 202-5), wherein the provisioning of the bandwidth demand $\overline{\beta}_e$ is performed in such a manner that in a case of failure of one of the disjoint SPaths connecting the source SNode and the destination SNode, a total bandwidth associated with the remaining disjoint SPaths is at least equal to BSR times the primary bandwidth demand.

Further, the reliability-aware virtual network embedding system 400 may embed the VLink (e.g. VLink 304-1) connecting a source VNode (e.g. VNode 302-1) and a destination VNode (e.g. VNode 302-1) onto disjoint SPaths connecting the source SNode (e.g. SNode 202-1) and the destination SNode (e.g. SNode 202-5) in accordance with the splitting operation discussed above.

With this said, the virtual network request module 402 may receive a request for a virtual network (e.g. virtual network 300), where the request may contain a virtual network topology and virtual network constraints associated with the virtual network. The virtual network topology may comprise VNodes (e.g. VNodes 302-1, 302-2, and 302-3), VLinks (e.g. VLinks 304-1 and 304-1), a bandwidth demand associated with each of the VLinks and BSR associated with each of the VLinks. The virtual network request module 402 may extract information associated with the virtual network (e.g. virtual network 300) and forward the information to the pre-computation module 406. Such information may be associated with the undirected graph G=(V, E) (e.g. SN 200) and includes reach table R, the undirected graph $\overline{G}=(\overline{V}, \overline{E})$ (e.g. virtual network 300) with location constraint set C(T), the bandwidth demand associated with Vlinks (e.g. Vlinks 204-1 ... 204-N) and BSR associated with each of the VLinks. The physical/substrate elastic optical network information module 404 provides the pre-computation module 406 with information associated with a physical/substrate elastic optical network (e.g. SN 200). Such information includes bandwidth capacity per link, length of a link, etc.

For each VLink $\overline{e} \in \overline{E}$, the pre-computation module 406 may compute $P_{\overline{e}}^k$, a set of k shortest paths between each pair of SNodes in the VLink's endpoints' location constraint set $C(\overline{u})$. For each substrate path (SPath) $p \in P_{\overline{e}}^k$, the pre-computation module 406 may compute a set of admissible transmission configurations, $T_{\overline{e}p} \subset T$, such that each configuration $t \in T_{\overline{e}p}$ results in a reach $r_t \geq \text{len}(p)$ and may have a data rate $t^{(d)}$. As such, each one of the VNodes may be mapped to exactly one SNode from its location constraint set $C(\overline{u})$, denoted by the following decision variable:

$$x_{\overline{u}u} = \begin{cases} 1 & \text{if } \overline{u} \in \overline{V} \text{ is mapped to } u \in V \\ 0 & \text{Otherwise} \end{cases}$$

Further, the bandwidth demand associated with the VLink (e.g VLink 304-1) may be satisfied by frequency slots provisioned over multiple SPaths (up to a maximum of q). Frequency slot provisioning over multiple SPaths may be performed using a combination of the following two cases:
  i. Allocating contiguous sets of frequency slots on distinct SPaths;
  ii. Allocating different contiguous sets of frequency slots on the same SPath (with the same or different transmission configuration(s))

The latter represents a scenario when there are sufficient frequency slots available over a SPath, however, its length does not allow provisioning the required data rate using a single contiguous set of frequency slots. To represent the second case, the pre-computation module 406 may consider each transmission configuration $t \in T$ for the SPath can be instantiated multiple times (up to a maximum of q times). The pre-computation module 406 consider the following variable to represent VLink mapping:

$$w_{\overline{e}pti} = \begin{cases} 1 & \text{if } \overline{e} \in \overline{E} \text{ uses i-th instance of } t \in T_{\overline{e}p} \text{ on} \\ & \text{path } p \in P_{\overline{e}}^k \\ 0 & \text{Otherwise} \end{cases}$$

The pre-computation module 406 also consider the following variable to represent relationship between a mapped SPath and the frequency slots in its SLinks:

$$y_{\overline{e}ptis} = \begin{cases} 1 & \text{if } \overline{e} \in \overline{E} \text{ uses } s \in S \text{ on path } p \in P_{\overline{e}}^k \text{ with the} \\ & \text{i-th instance of } t \in T_{\overline{e}p} \\ 0 & \text{Otherwise} \end{cases}$$

The constraint module 408 ensures various constraints have been considered appropriately while mapping the virtual network (e.g. virtual network 300) to the physical/substrate elastic optical network (e.g. SN 200). Such constraints include VNode mapping constraints, VLink demand constraints, frequency slot assignment constraints, and reliability constraints.

As such, using equations (1) and (2) the constraint module 408 ensures each VNode is mapped to SNode, while satisfying the location constraint. Using equation (3) the constraint module 408 ensures one SNode to host at most one VNode from the same virtual network.

$$\forall \overline{u} \in \overline{V}, \forall u \in V : x_{\overline{u}u} \leq c_{\overline{u}u} \tag{1}$$

$$\forall \overline{u} \in \overline{V} : \Sigma_{u \in V} x_{\overline{u}u} = 1 \tag{2}$$

$$\forall u \in V : \Sigma_{\overline{u} \in \overline{V}} x_{\overline{u}u} \leq 1 \tag{3}$$

Because a VLink (e.g. VLink 304-1) may be provisioned by splitting it across multiple SPaths (with a maximum of q splits), the constraint module 408 use constraint in equation (4) to ensure that for each VLink $\overline{e} \in \overline{E}$, the sum of data rates resulting from applying the selected transmission configuration $t \in T$ on the selected paths is equal to the VLink's demand. The constraint module 408 further use equation (13) to enforce an upper limit on the number of splits.

$$\forall \overline{e} \in \overline{E} : \beta_{\overline{e}} \leq \sum_{\forall p \in P_{\overline{e}}^k} \sum_{\forall t \in T_{\overline{e}p}} \sum_{i=1}^{q} (w_{\overline{e}pti} \times t^{(d)}) \tag{4}$$

$$\forall \overline{e} \in \overline{E} : \beta_{\overline{e}} \leq \sum_{\forall p \in P_{\overline{e}}^k} \sum_{\forall t \in T_{\overline{e}p}} \sum_{i=1}^{q} w_{\overline{e}pti} \leq q \tag{5}$$

To enforce the frequency slot assignment and spectral contiguity constraints, the constraint module 408, using equation (6), ensures that if a path p is selected with a specific transmission configuration $t \in T$, then the required number of frequency slots $n_t$ to support the data rate $t^{(d)}$ is allocated on the path p. Using equation (7), the constraint module 408 ensures that each frequency slot on a SLink is allocated to at most one substrate path. Finally, the constraint module 408 use equations (8) to ensure the frequency slots allocated to each SLink of the SPath form a contiguous frequency spectrum.

$$\forall \overline{e} \in \overline{E}, \forall p \in P_{\overline{e}}^k, \forall t \in T_{\overline{e}p}, 1 \leq i \leq q : \sum_{\forall s \in S} y_{\overline{e}ptis} = n_t w_{\overline{e}pti} \tag{6}$$

$$\forall e \in E, \forall s \in S : \sum_{\forall \overline{e} \in \overline{E}} \sum_{\forall p \in P_{\overline{e}}^k} \sum_{\forall t \in T_{\overline{e}p}} \sum_{i=1}^{q} w_{\overline{e}pti} y_{\overline{e}ptis} \delta_{pe} \leq 1 \tag{7}$$

-continued $$\forall \bar{e} \in E, \forall p \in P_{\bar{e}}^{k}, \forall t \in T_{ep}, 1 \leq i \leq q, \quad (8)$$

$$1 \leq s \leq |S| - 1: \sum_{s'=s+2}^{|S|} y_{eptis'} \leq |S| \times (1 - y_{eptis} + y_{epti(s+1)})$$

In order to ensure that for each single substrate link failure scenario, the aggregate data rate of the unaffected splits of a VLink $\bar{e} \in \bar{E}$ is at least $BSR_{\bar{e}}$ percentage of the original VLink demand, the constraint module 408 use equation (9).

$$\forall \bar{e} \in \bar{E} \forall e \in E: \left( \sum_{\forall p \in P_{\bar{e}}^{k}} \sum_{\forall t \in T_{ep}} \sum_{i=1}^{q} (w_{epti} \times t^{(d)}) \right) - \quad (9)$$

$$\left( \sum_{\forall p \in P_{\bar{e}}^{k}} \sum_{\forall t \in T_{ep}} \sum_{i=1}^{q} (w_{epti} \times t^{(d)}) \delta_{pe} \right) \geq 0.01 \times BSR_{\bar{e}} \times \bar{\beta}_{\bar{e}}$$

Based on inputs from constraint module 408, the solution selection module 410 may provide an objective function, as represented by the equation (10) either to the ILP solution module 412 or to the heuristic solution module 414. In certain embodiments, the selection criteria followed by the solution selection module 410 may be based on various factors, such as size of the virtual network to be provisioned, size of physical/substrate elastic optical network, time required to find a solution to embed the virtual network over the physical/substrate elastic optical network.

In certain embodiments, if the ILP solution module 412 is selected to compute an optimal SPath for embedding the virtual network (e.g. virtual network 300) onto SN 200, the solution selection module 410 may provide the objective function represented by equation (10) and all other constrains discussed from equation (1) to equation (9) to the ILP solution module 412. The ILP solution module 412 may perform a brute force search over each of the possible solution associated with equation (10). In so doing, the ILP solution module 412 may find an optimal SPath with a dedicated protection and differentiated reliability as well as a minimum number of frequency slots required to embed all VLinks of a virtual network (e.g. virtual network 300). However, if there are multiple possible solutions, in order to break ties among multiple solutions with the same total number of slots, the ILP solution module 412 may use a second term in equation (10) that minimizes the number of splits over all the VLinks. The weight £ in equation (10) is chosen in a way that the second term is effective only when multiple optimal solutions have the same value using the first term.

$$\text{minimize} \left( \sum_{\forall e \in E} \sum_{\forall p \in P_{\bar{e}}^{k}} \sum_{\forall t \in T_{ep}} \sum_{i=1}^{q} \sum_{\forall s \in S} y_{eptis} \times \quad (10) \right.$$

$$\left. |p| + \varepsilon \sum_{\forall e \in E} \sum_{\forall p \in P_{\bar{e}}^{k}} \sum_{\forall t \in T_{ep}} \sum_{i=1}^{q} w_{epti} \right)$$

Even though the above discussed functionality of ILP solution module 412 may provide an optimal embedding of the virtual network satisfying reliability and other constraints, the real time computational complexity, and the time required to embed such a virtual network may be prohibitively high. To address this, a more practical heuristic approach is needed to provide a reasonable solution in a reasonable amount of time. As an example, the heuristic approach described below may provide a suboptimal embedding that has an associated cost that may be up to, for e.g. 10%-15% more than the optimal embedding solution obtained through an exhaustive search approach. However the heuristic approach may arrive at the non-optimal solution in near real time. For example, for a large network with around 100 substrate nodes or more, the ILP solution may take up to several hours to compute an optimal embedding, while the heuristic based approach may find an acceptable solution in less than 1 second. The ability to determine near-optimal solutions in near real time allows for greater flexibility in provisioning networks. For example, virtual networks can be provisioned, tested, changes made to the virtual network, re-provisioned and tested again, all without requiring long wait times to determine possible embeddings for the virtual networks.

Figure 7:
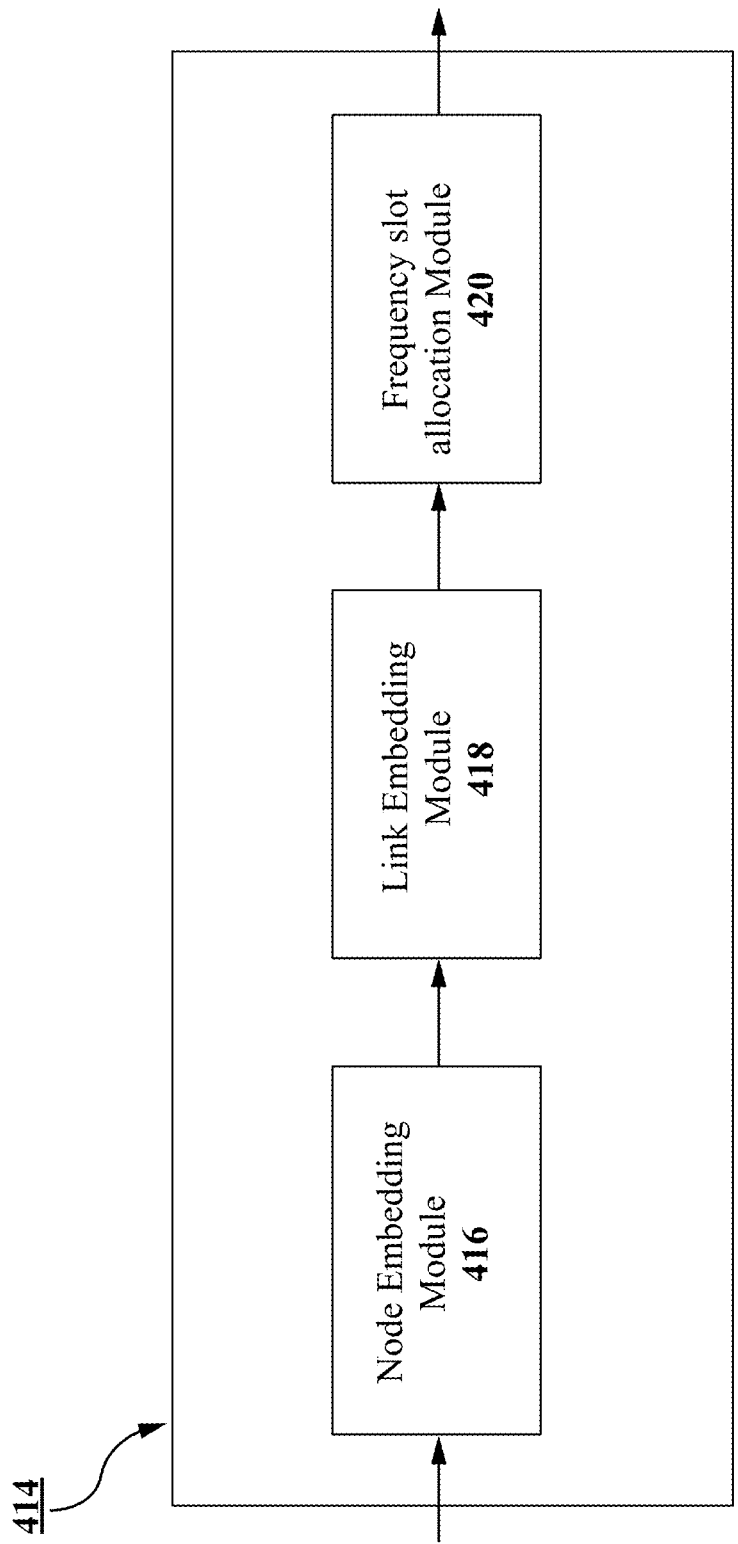
FIG. 7 illustrates a high-level functional block diagram of a heuristic solution module, in accordance with various aspects of present disclosure.

With this said, FIG. 7 illustrates a high-level functional block diagram of heuristic solution module 414, configured to compute a node embedding function, a link embedding function, and a total number of frequency slots required to provision a virtual network (e.g. virtual network 300) in accordance with various aspects of present disclosure. As shown, the heuristic solution module 414 employs a node embedding module 416, a link embedding module 418 and a frequency slot computation module 420. It is to be noted that other elements may be present, but are not illustrated for the purpose of tractability and simplicity.

In certain embodiments, if the heuristic solution module 414 is selected to compute an optimal SPath for embedding the virtual network (e.g. virtual network 300) onto SN 200, the solution selection module 410 may provide the objective function represented by equation (10) and all other constrains discussed from equation (1) to equation (9) to the heuristic solution module 414. As such, the node embedding module 416 may compute a node embedding function $\tau$: $\bar{V} \to V$, such that based on the node embedding function $\tau$ the node embedding module 416 may perform embedding each VNode $\bar{u} \in \bar{V}$ to an SNode $u \in C(\bar{u})$ in accordance with their location constraints.

Further, the link embedding module 418 may compute a link embedding function $\gamma$: $\bar{E} \to \mathcal{X}$ : $\mathcal{X} \subset P \times T \times S^2$ and $1 \leq |\mathcal{X}| \leq q$. In so doing, the link embedding module 418 computes the link embedding function $\gamma$ for a maximum q splits for each VLink $\bar{e} \in \bar{E}$ such that $BSR_{\bar{e}} \times \bar{\beta}_{\bar{e}}/100$ bandwidth is available during a SLink (e.g. SLink 204-1) failure and at least $\bar{\beta}_{\bar{e}}$ bandwidth is available during rest of the time. Further, the link embedding module 418 may select a SPath and an appropriate transmission configuration $t \in T$ from the reach table R for each split, and may allocate a contiguous segment of frequency slots represented by the starting and ending frequency slot index on each S Link along the SPath. $\mathcal{X}_{\bar{e}i} = (p, t, s_b, s_t) | 1 \leq i \leq q$ represents the i-th split, where $\mathcal{X}_{\bar{e}i}^{(p)}$ and $\mathcal{X}_{\bar{e}i}^{(t)}$ denote the selected SPath and transmission configuration $t \in T$ for the i-th split, respectively. In addition, allocation of spectrum frequency slots for the i-th split begins at index $\mathcal{X}_{\bar{e}i}^{(s_b)}$ and ends at index $\mathcal{X}_{\bar{e}i}^{(s_t)}$ along each SLink in the SPath $\mathcal{X}_{\bar{e}i}^{(p)}$.

To this end, the link embedding module 418 may consider a sequential VLink embedding order that is dynamically computed to converge to a solution within a reasonable time. Further, the link embedding module 418 may perform ordering of the VLinks $\bar{e} \in \bar{E}$ to obtain an ordered set O. In doing so, the link embedding module 418 may find a VLink order O to increase the chances of finding a feasible embedding for Vlinks $\bar{e} \in \bar{E}$. Computing a feasible embedding of a VLink may depend on the availability of contiguous frequency slots in the candidate SPath set of that VLink. The candidate SPath set may be defined as k shortest SPaths between each pair of SNodes in the VLink's endpoints' location constraint set C(T). If the candidate SPath set $P_{\bar{e}_i}^{\rightarrow k}$ of i-th VLink $\bar{e}_i \in \bar{E}$ have many SLinks that are common with the candidate SPath set of other VLinks that appear before $\bar{e}_i$ in the VLink order O, the frequency slots associated with these SLinks and the corresponding SPaths may be exhausted or fragmented in such a manner that the embedding of the VLink $\bar{e}_i$ may become difficult. It is to be noted that the VLinks placed after VLink $\bar{e}_i$ in the VLink order O does not have any impact on the embedding of the VLink $\bar{e}_i$, even though the VLink $\bar{e}_i$ and Vlinks after the VLink $\bar{e}_i$ may have common SLinks in the candidate SPath set. Therefore, the effective commonality of the VLink $\bar{e}_i$ depends on the VLink order O and may be defined as follows:

$$w(\bar{e}_i)^O = \Sigma_{\bar{e}_j \text{precedes } \bar{e}_i \text{in } O | \bar{e}_i \in \bar{E}, \bar{e}_j \in \bar{E}, \bar{e}_i \neq \bar{e}_j} w(\bar{e}_i, \bar{e}_j) \quad (11)$$

Where $w(\bar{e}_i, \bar{e}_j)$ is the commonality between two VLinks $\bar{e}_i$ and $\bar{e}_j$ irrespective of any order and is defined as follows:

$$w(\bar{e}_i, \bar{e}_j) = |\{(p_{\bar{e}_i}, p_{\bar{e}_j}) : (p_{\bar{e}_i}, p_{\bar{e}_j}) \in P_{\bar{e}_i}^k \times P_{\bar{e}_j}^k \wedge p_{\bar{e}_i} \cap p_{\bar{e}_j} \neq \emptyset\}| \quad (12)$$

A high value of $w(\bar{e}_i, \bar{e}_j)$ indicates more SPath pairs from the candidate SPath set of i-th VLink $\bar{e}_i$ and j-th VLink $\bar{e}_j$ have common SLinks. Based on equation (11) the commonality index of VLink order O may be defined as follows:

$$w^O = \max_{\bar{e}_i \in \bar{E}} w(\bar{e}_i)^O \quad (13)$$

In order to increase the probability of finding a feasible embedding for all the Vlinks $\bar{e} \in \bar{E}$, the link embedding module 418 may construct an auxiliary graph Z=(N, A) based on virtual network graph $\bar{G} = (\bar{V}, \bar{E}$ (e.g., SN 200). The auxiliary graph Z=(N, A) may be a weighted undirected graph) (e.g. virtual network 300), and physical/substrate elastic optical network graph G=(V, E) where N is the set of nodes and A is the set of edges. As such, there may be one-to-one correspondence between a node $n_{\bar{e}_i} \in N$ and the VLink $\bar{e}_i \in \bar{E}$ therefore, an order of the nodes in N may also correspond to the VLink order O in the set of VLinks $\bar{E}$. Further, the link embedding module 418 includes a weighted node $(n_{\bar{e}_i}, n_{\bar{e}_j}) \in A$ between two distinct nodes $n_{\bar{e}_i} \in N$ and $n_{\bar{e}_j} \in N$ with weight $w(n_{\bar{e}_i}, n_{\bar{e}_j})$. Using equation (14) the weight of a node $n_{\bar{e}_i} \in N$ may be defined as follows:

$$w(n_{\bar{e}_i}) = \sum_{n_{\bar{e}_j} | (n_{\bar{e}_i}, n_{\bar{e}_j})} w(n_{\bar{e}_i}, n_{\bar{e}_j}) \quad (14)$$

In order to compute VLink order O that minimizes $w^O$, the link embedding module 418 may iteratively compute $w(n_{\bar{e}_i})$ using equation (14). The link embedding module 418 then selects a node $n_{\bar{e}_i}^{min}$ in the auxiliary graph Z=(N, A) that has a minimum $w(n_{\bar{e}_i})$ and inserts the corresponding VLink to the last empty spot in the VLink order O. Afterward, the link embedding module 418 may remove the node $n_{\bar{e}_i}^{min}$ and all of its incident edges and update the auxiliary graph Z=(N, A). In this manner the updated auxiliary graph Z=(N, A) may assist the link embedding module 418 to compute $w(n_{\bar{e}_i})$ that corresponds to $w(\bar{e}_i)^O$, as updated the updated auxiliary graph Z=(N, A) may now have all the nodes (and adjacent edges) that precedes $n_{\bar{e}_i}^{min}$ in the VLink order O. The link embedding module 418 may repeat this process until all the Vlinks in the set of VLinks $\bar{E}$ have been added to the VLink order O. In so doing, the link embedding module 418 may compute the VLink order O with a minimum commonality index.

In order to perform embedding of the set of VLinks $\bar{E}$ in accordance with VLink order O, the link embedding module 418 may compute a multi-set of SPaths where each SPath in the multi-set has an associated transmission configuration $t \in T$ and spectrum slot allocation. It is to be noted that the bandwidth requirement for dedicated protection against single SLink failure for a VLink $\bar{e}$ depends on $BSR_{\bar{e}}$ and the number of disjoint SPaths used in the multi-set of SPaths of a solution. In order to exploit disjointness of the SPaths in the candidate SPath set $P_{\bar{e}}^k$ of a VLink $\bar{e}$, the link embedding module 418 first computes disjoint SPath groups $H_{\bar{e}}$ from $P_{\bar{e}}^k$ as follows:

$$H_{\bar{e}} = \{\delta P_{\bar{e}}^k | \delta P_{\bar{e}}^k \subseteq P_{\bar{e}}^k \text{ and } |\delta P_{\bar{e}}^k| > 1 \text{ and the SPaths in } \delta P_{\bar{e}}^k \text{ are link disjoint}\} \quad (15)$$

It is to be further noted that two SPaths belonging to two different disjoint SPath groups $H_{\bar{e}}^i$ and $H_{\bar{e}}^j$ may share a SLink and a SPath can appear in multiple disjoint SPath groups. The set of all disjoint SPath groups for a VLink $\bar{e}$ may be denoted by $\mathcal{H}_{\bar{e}}$.

In certain embodiments, the link embedding module 418 applies a heuristic to obtain a smaller set of disjoint SPath groups $\mathbb{H} \subseteq \mathcal{H}_{\bar{e}}$ that includes the most probable SPaths to be used in splitting of VLink $\bar{e}$. In so doing, the link embedding module 418 may select first σ disjoint SPath groups ranked by the increasing average distance of the group. The link embedding module 418 may select the value of a in a manner to keep the size of $\mathbb{H}_{\bar{e}}$ small.

After computing $\mathbb{H}_{\bar{e}}$, the link embedding module 418 may enumerate all non-empty subsets of $\mathbb{H}_{\bar{e}}$ to assign data rates to each disjoint SPath group in the subset such that each group provides dedicated protection as per $BSR_{\bar{e}}$ requirement for its data rate. For each subset $\delta \mathbb{H}_{\bar{e}} \subseteq \mathbb{H}_{\bar{e}}$, the link embedding module 418 selects $|\delta \mathbb{H}_{\bar{e}}|$ data rates such that the sum of these data rates equal to the bandwidth demand $\bar{\beta}_{\bar{e}}$ associated with each VLink $\bar{e}$. These combinations of data rates may be represented by a multi-set $\mathbb{D}_{\delta \mathbb{H}_{\bar{e}}} = (\mathcal{D}, m_1)$, where $\mathcal{D}$ is the set of all data rates, and $m_1: \mathcal{D} \rightarrow \mathbb{N}$ is the number of times a data rate in $\mathcal{D}$ appears in $\mathbb{D}_{\delta \mathbb{H}_{\bar{e}}}$. $\mathcal{M}(\mathbb{D}_{\delta \mathbb{H}_{\bar{e}}})$ may represent all possible multi-sets of $\mathbb{D}_{\delta H_{\bar{e}}}$.

In certain embodiments, the link embedding module 418 may enumerate all permutations of data rates from $\mathbb{D}_{\delta \mathbb{H}_{\bar{e}}}$ to assign data rates in $\mathbb{D}_{\delta \mathbb{H}_{\bar{e}}}$ to $|\mathbb{D}_{\bar{e}}|$ SPath groups. In so doing, the link embedding module 418 may generate all permutations of data rates for each multiset $\mathbb{D}_{\delta \mathbb{H}_{\bar{e}}} \in \mathcal{M}(\mathbb{D}_{\delta \mathbb{H}_{\bar{e}}})$, denoted by $\zeta \mathbb{D}_{\delta \mathbb{H}_{\bar{e}}}$. For each of these permutations of data rates $\mathbb{D}_{\delta \mathbb{H}_{\bar{e}}} \in \zeta(\mathbb{D}_{\delta \mathbb{H}_{\bar{e}}})$, the link embedding module 418 may assign a data-rate $d_{H_{\bar{e}}}$ from $\mathbb{D}_{\delta \mathbb{H}_{\bar{e}}}$ to a disjoint SPath group $H_{\bar{e}} \in \delta \mathbb{H}_{\bar{e}}$ in the same order. For each disjoint SPath group $H_{\bar{e}} \in \delta \mathbb{H}_{\bar{e}}$ with its assigned data-rate $d_{H_{\bar{e}}}$, the link embedding module 418 computes the data-rate $d_{pH_{\bar{e}}}$ of an SPath $p \in H_{\bar{e}}$ using equation (16) that takes into consideration the number of disjoint SPaths in $H_{\bar{e}}$ and $BSR_{\bar{e}}$ of the VLink $\bar{e}$. $d_{pH_{\bar{e}}}$ is computed in a manner such that the SPaths in H $\bar{e}$ protect $BSR_{\bar{e}}$ fraction of $d_{H_{\bar{e}}}$ under any single SLink failure. However, in certain embodiments when $BSR_{\bar{e}}$ is low, protection requirement may not be enough to provide the assigned data-rate $d_{H_{\bar{e}}}$. In this case, data-rate $d_{pH_{\bar{e}}}$ for a SPath is computed by equally dividing $d_{H_{\bar{e}}}$ along each disjoint SPath in $H_{\bar{e}}$. It is to be noted that each SPath in $H_{\bar{e}}$ may have an equal data-rate $d_{pH_{\bar{e}}}$.

$$d_{pH_{\bar{e}}} = \max\left(\frac{d_{H_{\bar{e}}} \times BSR_{\bar{e}}}{100 \times (|H_{\bar{e}}| - 1)}, \frac{d_{H_{\bar{e}}}}{|H_{\bar{e}}|}\right) \quad (16)$$

Since a SPath p may appear in multiple disjoint SPath groups in $\delta\mathbb{H}_{\bar{e}}$, the link embedding module 418 may compute the total data rate assigned to p (denoted by $d_{p\delta H_{\bar{e}}}$) using equation (17).

$$d_{p\delta H_{\bar{e}}} = [\Sigma_{\forall H_{\bar{e}} \in \delta} \mathbb{H}_{\bar{e}} d_{pH_{\bar{e}}}] \quad (17)$$

After computing the total data-rate $d_{p\delta H_{\bar{e}}}$, the link embedding module 418 may have a set of distinct (not necessarily disjoint) SPaths $P_\delta \mathbb{H}_{\bar{e}}$ and their assigned data rates for a particular $\delta \mathbb{H}_{\bar{e}}$ and $\mathbb{D}_\delta \mathbb{H}_{\bar{e}}$. Since for a SPath$\in P_\delta \mathbb{H}_{\bar{e}}$ the associated data-rate $d_{p\delta} \mathbb{H}_{\bar{e}}$ may be split into smaller data rates either to ensure spectrum contiguity or to minimize the number of frequency slots. To this end, the link embedding module 418 may generate and enumerate the set of all possible multi-sets $\mathcal{M}(\mathbb{P}_\delta \mathbb{H}_{\bar{e}})$ out of the set P$\delta \mathbb{H}_{\bar{e}}$. A multi-set $\mathbb{P} \delta H_{\bar{e}} \in \mathcal{M}(\mathbb{P}_\delta \mathbb{H}_{\bar{e}})$ may be defined as $\mathbb{P} \delta \mathbb{H}_{\bar{e}} = (P_\delta \mathbb{H}_{\bar{e}}, m_2)$, where, $m_2$: $P_\delta \mathbb{H}_{\bar{e}} \to \mathbb{N}$ is the number of times a SPath in $P_\delta \mathbb{H}_{\bar{e}}$ appears in $\mathbb{P}_\delta \mathbb{H}_{\bar{e}}$. For each multi-set $\mathbb{P}_\delta \mathbb{H}_{\bar{e}}$, the link embedding module 418 may assign data rates to each instance of SPath in $\mathbb{P}_\delta \mathbb{H}_{\bar{e}}$. This may be trivial for a SPath that appears once in $\mathbb{P}_\delta \mathbb{H}_{\bar{e}}$ ($m_2(p)=1$). However, for a SPath with $m_2(p) > 1$, the link embedding module 418 distributes the assigned data-rate $d_{p\delta} \mathbb{H}_{\bar{e}}$ into $m_2(p)$ splits by generating permutations of multi-sets of data rates of size $m_2(p)$. In order to get the set of all data-rate permutations $\mathcal{M}(\mathbb{D}_{\mathbb{P}_{\delta H_{\bar{e}}}})$ for $\mathbb{P}_\delta \mathbb{H}_{\bar{e}}$, the link embedding module 418 may consider all possible ways to combine the data-rate permutations of each distinct SPath in $P_\delta \mathbb{H}_{\bar{e}}$.

Once the link embedding module 418 has a SPath multi-set $\mathbb{P}_\delta \mathbb{H}_{\bar{e}}$ and its corresponding data-rate permutation $D_{\mathbb{P}_{\delta H_{\bar{e}}}}$, the link embedding module 418, computes a feasible SPath comprising of transmission configurations and frequency slot allocations. The link embedding module 418, using dynamic programming procedures, first selects a transmission configuration t∈T to achieve a data rate along a SPath and allocates the frequency slots required by the transmission configuration t∈T. In certain embodiments, the frequency slot allocation may be performed by techniques known to a person skilled in the art, such techniques may include First-Fit approach. Among all the feasible SPaths returned by dynamic programming procedures, the link embedding module 418 may select the SPath (with maximum up to q splits) for a given VLink ē that minimizes equation (10). Further, the link embedding module 418 may embed the selected SPath (with maximum up to q splits) onto the SN 200.

The functionality of the heuristic solution module 414 may be subject to substrate resource constraints, and spectral contiguity (i.e., the allocated frequency slots of each split are always adjacent to each other) and continuity constraints (i.e., the same sequence of frequency slots are allocated on each SLink along an SPath) on the SPaths.

Finally, for the embedded SPath (with a maximum of q splits) obtained from the link embedding module 418 the frequency slot allocation module 420 performs frequency slot allocation to the SLinks associated with the embedded SPath in accordance with the transmission configuration as provided by the link embedding module 418.

It will be appreciated that, although the functionality of various systems, such as system 400, has been discussed individually. However these systems may be implemented on the system 100 by any one or more of hardware-based, software-based, and firmware-based elements.

Figure 8:
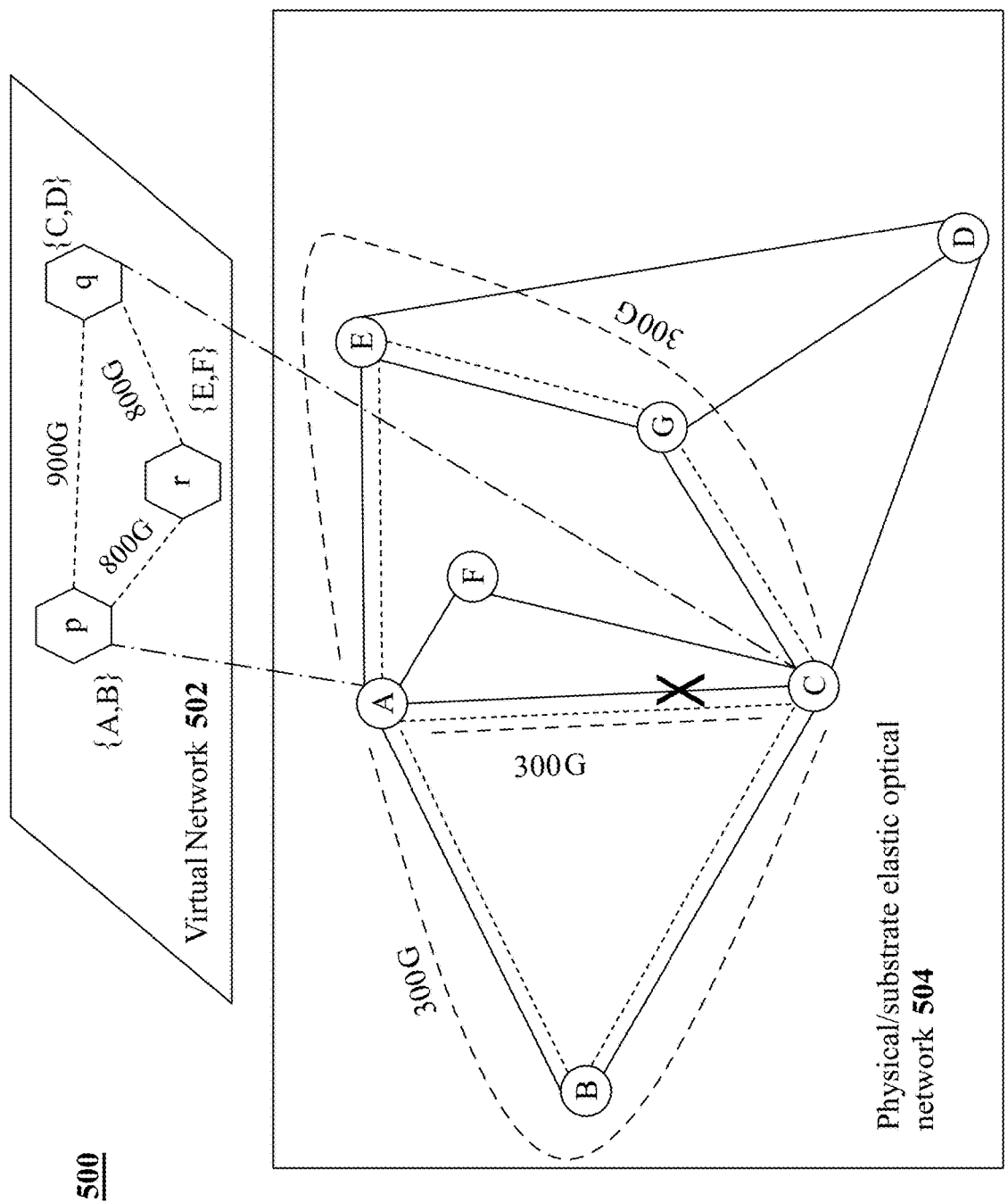
FIG. 8 illustrates a representative example of the SN with the virtual network embedded onto it, in accordance with various aspects of present disclosure.

FIG. 8 illustrates a representative example of the SN 504 embedded with the virtual network 502, in accordance with various aspects of present disclosure. As shown, the virtual network 502 and the physical/substrate elastic optical network 504. As shown, a virtual network 502 consists of a source VNodes p and a destination VNode q, and a physical/substrate optical network consists of SNodes A, B, C, D, E, F, and G. The location constraints associated with the VNode p are SNodes A and B and the location constraints associated with the VNode are SNodes C and D. That is, to embed the virtual network over the physical/substrate optical network 504, the VNode p can only be mapped to SNodes A and B and the VNode q can only be mapped to SNodes C and D.

Further, the bandwidth demand associated with the VLink between the source VNode p and the destination VNode q may be 900 Gbps and a have an associated BSR of 66.6%. In order to embed the virtual network using reliability-aware virtual network embedding system 400, the source VNode p may be randomly mapped to a source SNode A and the destination VNode q may be randomly mapped to a destination SNode G. The bandwidth demand of 900 Gbps associated with the VLink may be split over three disjoint SPaths as computed by the reliability-aware virtual network embedding system 400. The first disjoint SPath may be through SNodes A, B, and C with associated bandwidth of 300 Gbps. The second disjoint SPath may be through SNodes A and C with associated bandwidth of 300 Gbsp. The third disjoint SPath may be through SNodes A, E, G, and C with associated bandwidth of 300 Gbps.

In this manner, in case of a SLink failure in one of the disjoint SPath (for example SLink between SNodes A and C has been failed), the remaining disjoint SPaths is still being able to provide bandwidth at least equal to 66.6% of primary bandwidth demand, i.e. 600 Gbps in this case. Thus the total bandwidth associated with the VLink between the source VNode p and the destination VNode q provisioned over the physical/substrate optical network 504 equals to the bandwidth demand by the VLink. In case of a SLink failure, the remaining disjoint path may still be used. It is to be noted that in certain embodiments the total bandwidth provisioned to embed a VLink may be greater than the primary bandwidth in accordance with the associated BSR. However, in case of SLink failure, the remaining disjoint paths may still be used while providing bandwidth in accordance of BSR.

Figure 9:
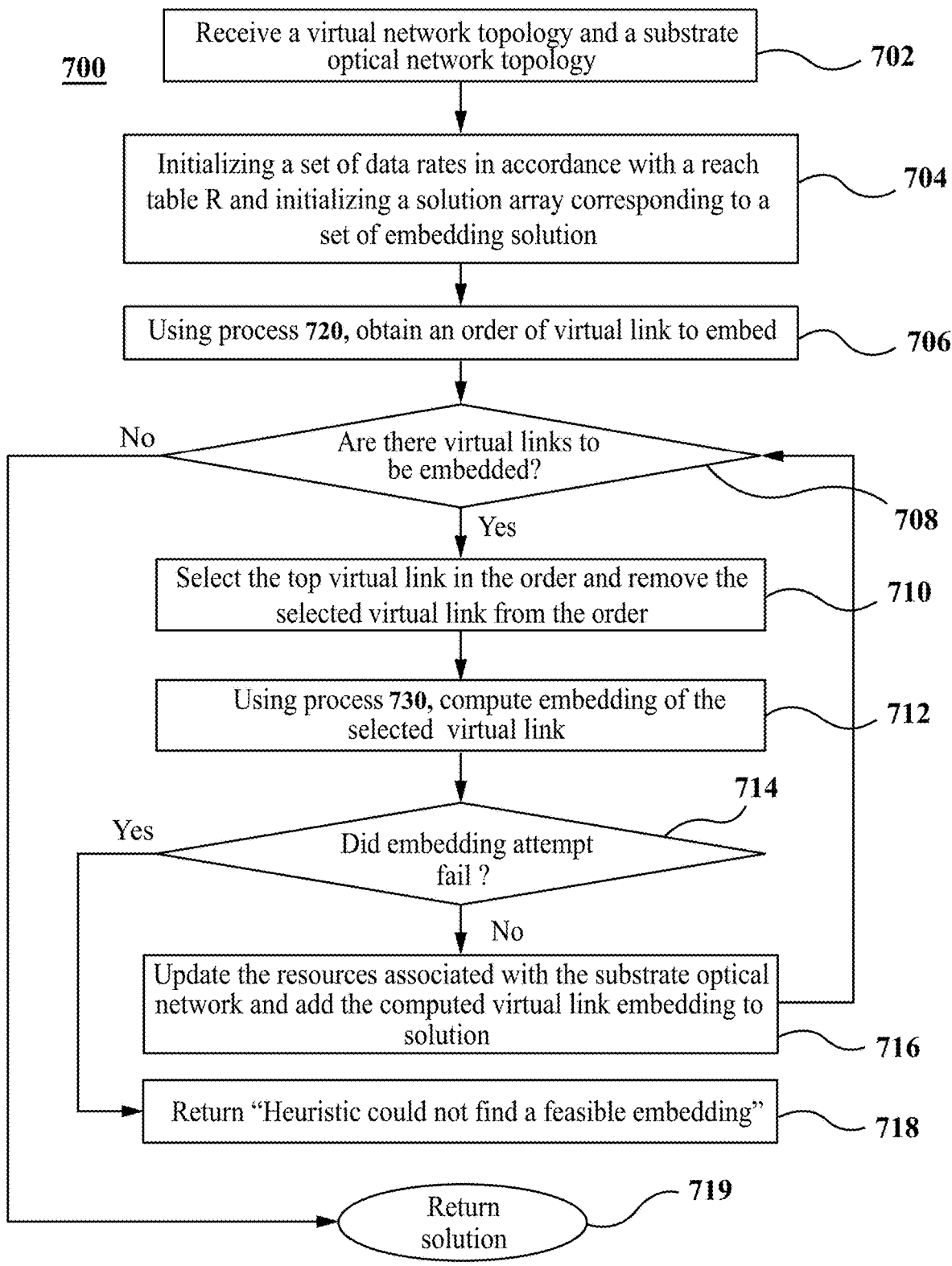
FIGS. 9, 10, and 11 illustrate representative examples of functional flow diagrams of a heuristic process directed to a method for reliability-aware virtual network embedding implemented in the reliability-aware virtual network embedding system, in accordance with various embodiments of present disclosure.
Figure 10:
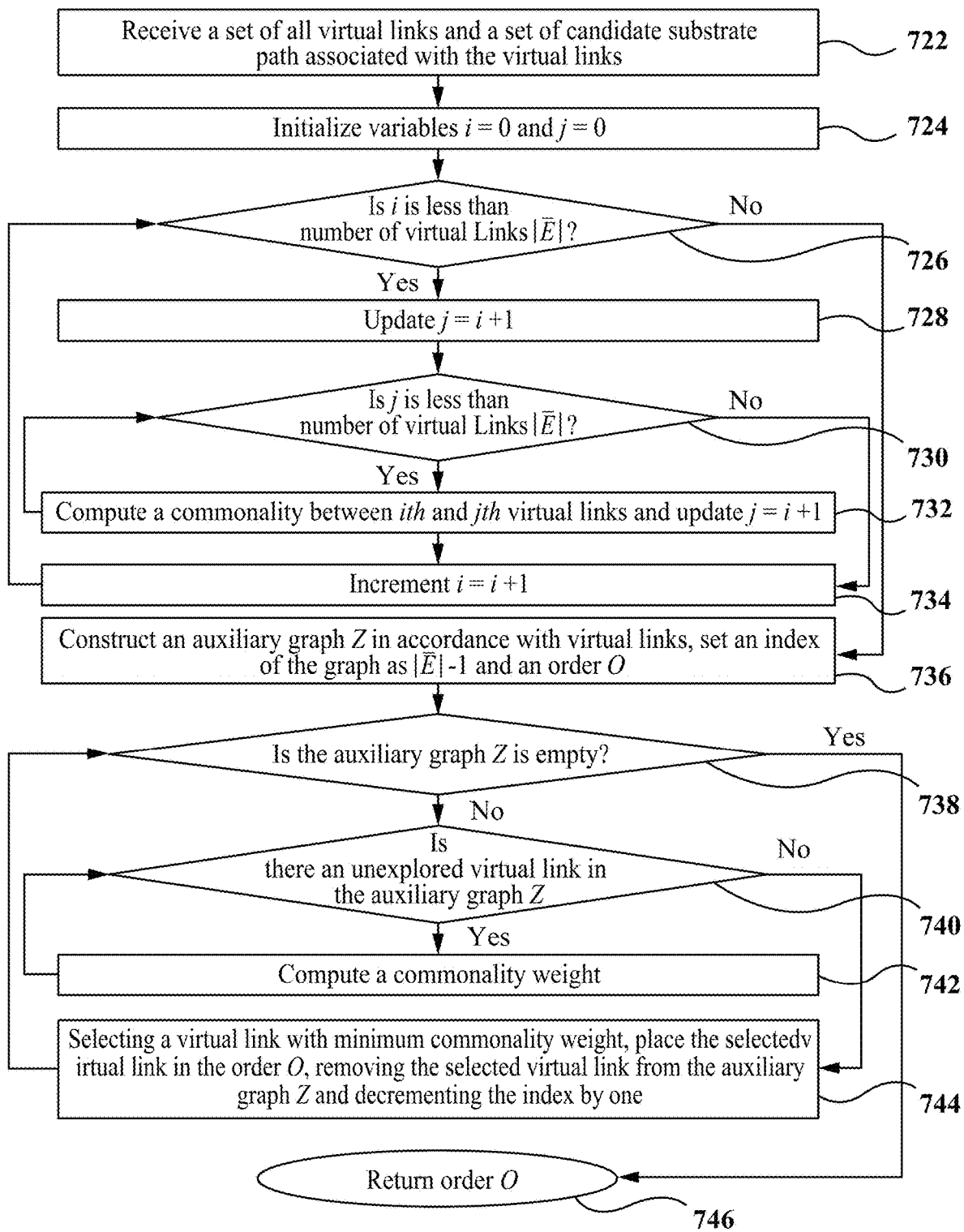
Figure 11:
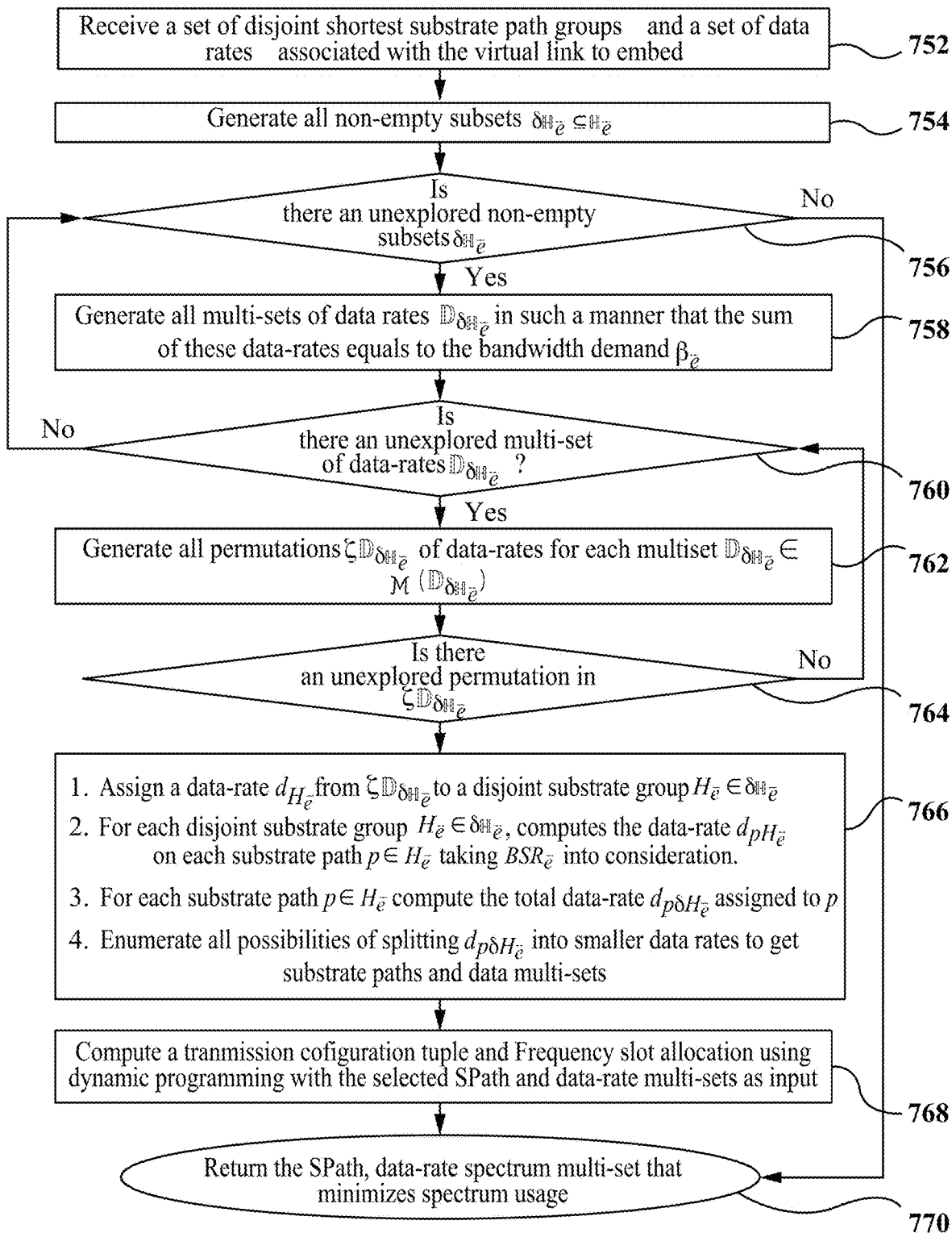

FIGS. 9, 10, and 11 illustrate representative examples of functional flow diagrams 700, 720, and 750 of a heuristic process directed to a method for virtual network embedding implemented in the reliability-aware virtual network embedding system 400, in accordance with various embodiments of present disclosure. As shown in FIG. 9, the process 700 commences at task block 702. At task block 702, the process 700 receives information associated with the virtual network topology and the substrate network topology.

The process 700 then advances to task block 704 where the process 700 initializes a set of data rate present in the reach table R and initializes a solution array corresponding to a set of embedding solution The process 700 proceeds to task block 706 and passes the control to the process 720 in order to obtain the VLink order O for embedding the Vlinks. As shown in FIG. 10, the process 720 begins at task block 722. At task block 722, the process 720 receives the set of VLinks E̅ and a set of candidate SPaths associated with each VLink in the set of Vlinks E̅. The candidate SPath set may be defined as k shortest SPaths between each pair of SNodes in the VLink's endpoints' location constraint set C(T).

At task block 724, the process 720 initializes a variable i and a variable j equal to zero and proceeds to task block 726. At task block 726, the process 720 compares the value of the variable i with the number of VLinks |E| in the set of VLinks E. If the value of the variable i is greater than the number of VLinks |E|, the process 720 advances to task block 736. However, if the value of the variable i is smaller than the number of VLinks |E|, the process 720 advances to task block 728.

At task block 728, the process 720 updates the value of the variable j as j=i+1 and proceeds to task block 730. At task block 730, the process 720 compares the value of the variable j with the number of VLinks |E| in the set of VLinks E. If the value of the variable j is greater than the number of VLinks |E|, the process 720 advances to task block 734. At task block 734, the process 720 updates the value of value variable i as i=i+1 and the returns to task block 726. However, if the value of the variable j is smaller than the number of VLinks |E|, the process 720 advances to task block 732.

At task block 732, the process 720 computes the commonality between ith and jth VLinks as $w(\bar{e}_i,\bar{e}_j)=|\{(p_{\bar{e}_i},p_{\bar{e}_j}): (p_{\bar{e}_i},p_{\bar{e}_j})\in P_{\bar{e}_i}^k \times P_{\bar{e}_j}^k \wedge p_{\bar{e}_i} \cap p_{\bar{e}_j} \neq \emptyset\}|$ and updates the value of variable j as j=j+1 and the process 720 then returns to task block 730.

At task block 736, the process 720 constructs the auxiliary graph Z=(N, A) and sets an index of the graph as |E|−1 and initializes the VLink order O as zero. The process 720 then advances to task block 738. At task block 738, the process 720 verifies if the auxiliary graph Z=(N, A) is empty or not. If the auxiliary graph Z=(N, A) is empty, the process advances to task block 746, else the process proceeds to task block 740.

At task block 740, the process 720 verifies that if there are any unexplored VLinks in the auxiliary graph Z=(N, A). If there are any unexplored VLinks in the auxiliary graph Z=(N, A), the process 720 advances to task block 742, else the process advances to task block 744. At task block 742, the process 720 computes the commonality weight as $w(n_{\bar{e}_j})=\Sigma n_{\bar{e}_j}|(n_{\bar{e}_i},n_{\bar{e}_j}) \; w(n_{\bar{e}_i}, n_{\bar{e}_j})$ and the process 700 returns to the task block 740.

At task block 744, the process 720 selects the VLink with minimum commonality weight $w(n_{\bar{e}_j})$, places the selected VLink in the VLink order O, removes the selected VLink from the auxiliary graph Z=(N, A) and decrements the index of the graph by one.

Finally, at task block 746, the process 720 returns the VLink order O to the process 700 at task block 706. Returning to FIG. 9, the process 700 after receiving the VLink order O at task block 706 proceeds to task block 708. At task block 708, the process 700 inspect if there are any VLinks to embed in accordance with the VLink order O. If there are VLinks to embed, the process 700 advances to task block 710, else the process advances to task block 719.

At task bock 710, the process 700 selects the top VLink in the VLink order O and removes the selected VLink from the VLink order O. The process 700 then proceeds to task block 712.

At task block 712, the process 700 passes the control to the process 750 in order to compute embedding of the selected VLink from the VLink order O. As shown in FIG. 11, the process 750 begins at task block 752. At task block 752, the process 750 receives from the process 700 a set of k disjoint shortest SPath groups $\mathbb{H}_{\bar{e}}$ and a set of data rates $\mathcal{D}$ associated with the VLink to embed.

The process 750 advances to task block 754, where the process 750 generates all non-empty subsets $\delta\mathbb{H}_{\bar{e}} \subseteq \mathbb{H}_{\bar{e}}$ and proceeds to task block 756. At task block 756, the process 750 verifies that if there is any unexplored non-empty subsets $\delta\mathbb{H}_{\bar{e}}$. If there are any unexplored non-empty subsets $\delta\mathbb{H}_{\bar{e}}$, the process 750 advances to task block 758, else the process advances to task block 770.

At task block 758, the process 750 generates all multi-sets of data rates $\mathbb{D}_\delta\mathbb{H}_{\bar{e}}$ in such a manner that the sum of these data rates equal to the bandwidth demand $\bar{\beta}_{\bar{e}}$ associated with the VLink to embed. The process 750 then advances to task block 760. At task block 760, the process 750 verifies that if there is any unexplored multisets of data rates $\mathbb{D}_\delta\mathbb{H}_{\bar{e}}$. If there are any unexplored multi-sets of data rates $\mathbb{D}_\delta\mathbb{H}_{\bar{e}}$, the process 750 advances to task block 762, else the process returns to task block 766.

At task block 762, the process 750 generates all permutations $\zeta\mathbb{D}_\delta\mathbb{H}_{\bar{e}}$ of data rates for each multiset $\mathbb{D}_\delta\mathbb{H}_{\bar{e}} \in \mathcal{M}(\mathbb{D}_\delta\mathbb{H}_{\bar{e}})$, and the process advances to task block 764. At task block 764, the process 750 verifies that if there is any unexplored permutations $\zeta\mathbb{D}_\delta\mathbb{H}_{\bar{e}}$. If there are any unexplored permutations $\zeta\mathbb{D}_\delta\mathbb{H}_{\bar{e}}$, the process 750 advances to task block 766, else the process returns to task block 760.

At task block 766, the process 750 assigns a data rate $d_H$ $\bar{e}$ from $\zeta\mathbb{D}_\delta\mathbb{H}_{\bar{e}}$ to a disjoint substrate group $H_{\bar{e}} \in \delta\mathbb{H}_{\bar{e}}$. For each disjoint substrate group $H_{\bar{e}} \in \delta\mathbb{H}_{\bar{e}}$, the process 750 computes the data rate $d_{pH_{\bar{e}}}$ on each substrate path $p \in H_{\bar{e}}$ taking $BSR_{\bar{e}}$ into consideration. For each substrate path $p \in H$ $\bar{e}$ the process 750 computes the total data rate $d_{p\delta}\mathbb{H}_{\bar{e}}$ assigned to p and enumerate all possibilities of splitting $d_{p\delta}\mathbb{H}_{\bar{e}}$ into smaller data rates to get substrate paths and data multi-sets.

The process 750 advances to task block 668, where the process 750 computes a transmission configuration tuple and frequency slot allocation using dynamic programming with the selected SPath and data-rate multi-sets as input. Finally, at task block 770, the process 750

Finally, at task block 770, the process 750 returns SPath, data rates and frequency slots of the multi-set that maximizes the spectrum usage to be used to the process 700 at task block 712. Returning to FIG. 9, the process 700 advances to task block 714 where the process 700 verifies if the embedding was successful or failed. If the embedding was successful, the process 700 proceeds to task block 716. If the embedding was failed, the process advances to task block 718.

At task block 716, the process 700 update the resources associated with the physical/substrate elastic optical network in accordance with the computed embedding and the computed virtual link embedding is added to the solution array and the process 700 returns task block 708. Finally, at task block 716, the process 700 returns that heuristic process could not find a feasible embedding. Finally, at task block 719, the process 700 returns the solution array.

It should be understood that in some embodiments, the embedding of a link may be left to another element, allowing for the implementation of the above described method, or the corresponding apparatus to be implemented as a VN mapping tool that maps VN nodes and links onto elements of the substrate network, generating an embedding plan that may be used by other nodes, such as a network orchestrator.

Figure 12:
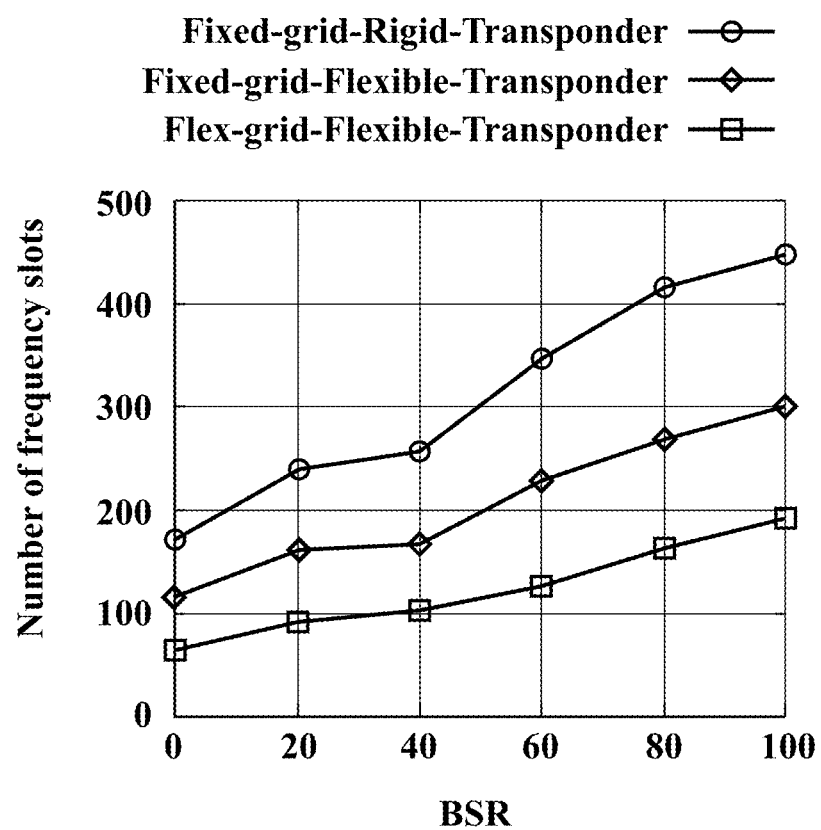
FIGS. 12-15, illustrate various representative scenarios comparing performance of a fixed grid network and elastic optical network implementing same virtual network embedding, in accordance with various embodiments of present disclosure.

FIGS. 12-15 illustrate various representative scenarios comparing performance in a fixed grid network and an elastic optical network implementing same virtual network embedding, in accordance with various embodiments of present disclosure. As shown FIG. 12 illustrates the impact of varying BSR on frequency slots usage for all cases. The frequency slot usage is highest for the baseline variant, fixed-grid-rigid-transponder, as the rigid transponder does not allow any flexibility in tuning transmission parameters t or frequency slots allocation.

In contrast, a system with fixed-grid-flexible-transponder uses 30% less spectrum resources on average compared to fixed-grid-rigid-transponder by only using tuneable transponders with coarse grained frequency slots allocation. Thus by combining flexible frequency slots allocation with transponder tenability, flexible-grid-flexible-transponder saves on average 57% and 27% spectrum compared to fixed-grid-rigid-transponder and fixed-grid-flexible-transponder, respectively. Also, the increase in frequency slots usage is small when BSR is increased from 20% to 40%, while increases sharply beyond 40% BSR. Further, fixed-grid-rigid-transponder may become to embed infeasible for some problem instances at BSR>80 due to its inflexibility in transmission configuration tuning and spectrum allocation.

Figure 13:
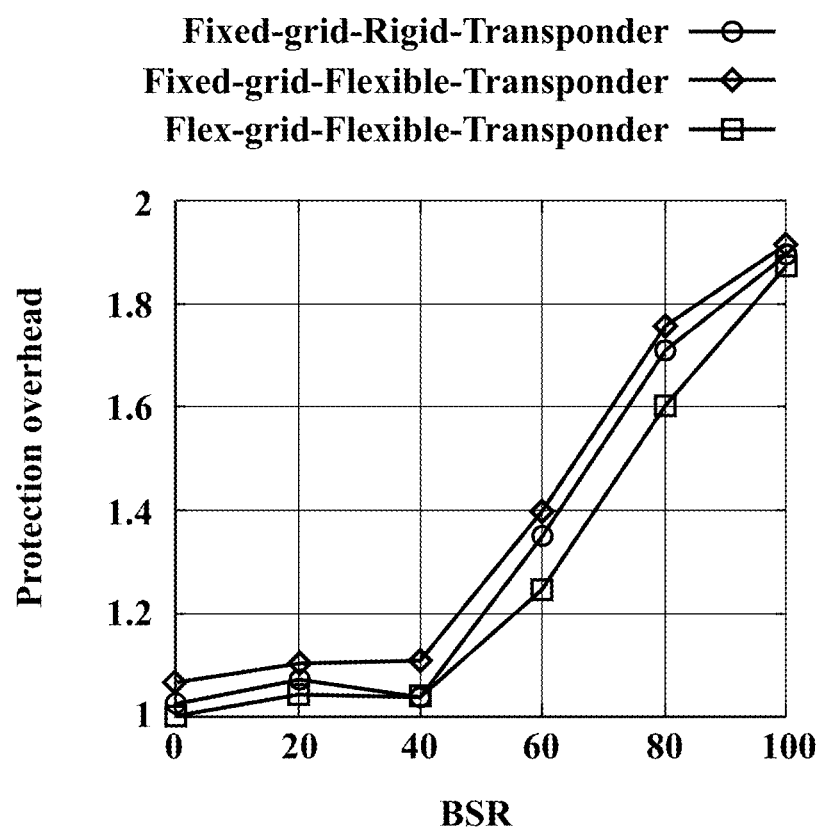

FIG. 13 illustrates the impact of varying BSR on protection overhead for all cases. The protection overhead represents a ratio between total bandwidth allocated of a VLink (on all different disjoint SPaths) and the primary bandwidth demand of the VLink. It is a measure of the required extra bandwidth for providing protection. As shown, the additional bandwidth required to provide dedicated protection remains within 10% of the originally requested bandwidth for BSR up to 40%. However, additional bandwidth requirement increases sharply beyond 40% BSR, contributing to a higher slope of increase in SSU beyond 40% BSR.

In certain embodiments, a pruning procedure may be added to the heuristic algorithm implemented in the heuristic process 750. This addition of the pruning procedure may reduce the execution time without sacrificing the performance in terms of frequency slots usage. As such, the pruning procedure may be applied to task blocks 762 and 766. In doing so, during special cases whereby when the required number of contiguous sets of frequency slots is not available on any SLink for example, the heuristic process 750 may declare that a solution is infeasible using that configuration and moves on to next candidate of the multiset.

Figure 14:
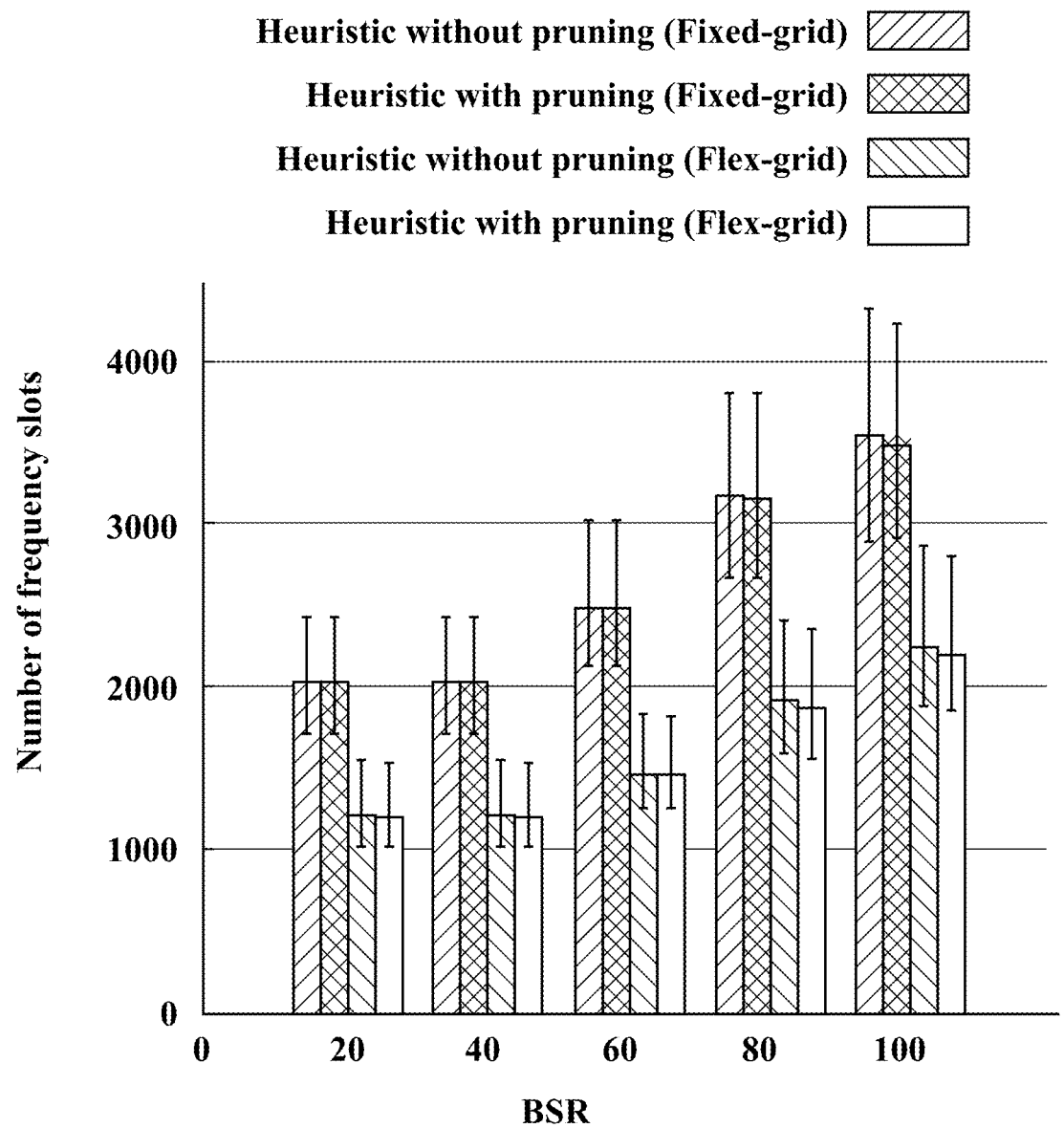
Figure 15:
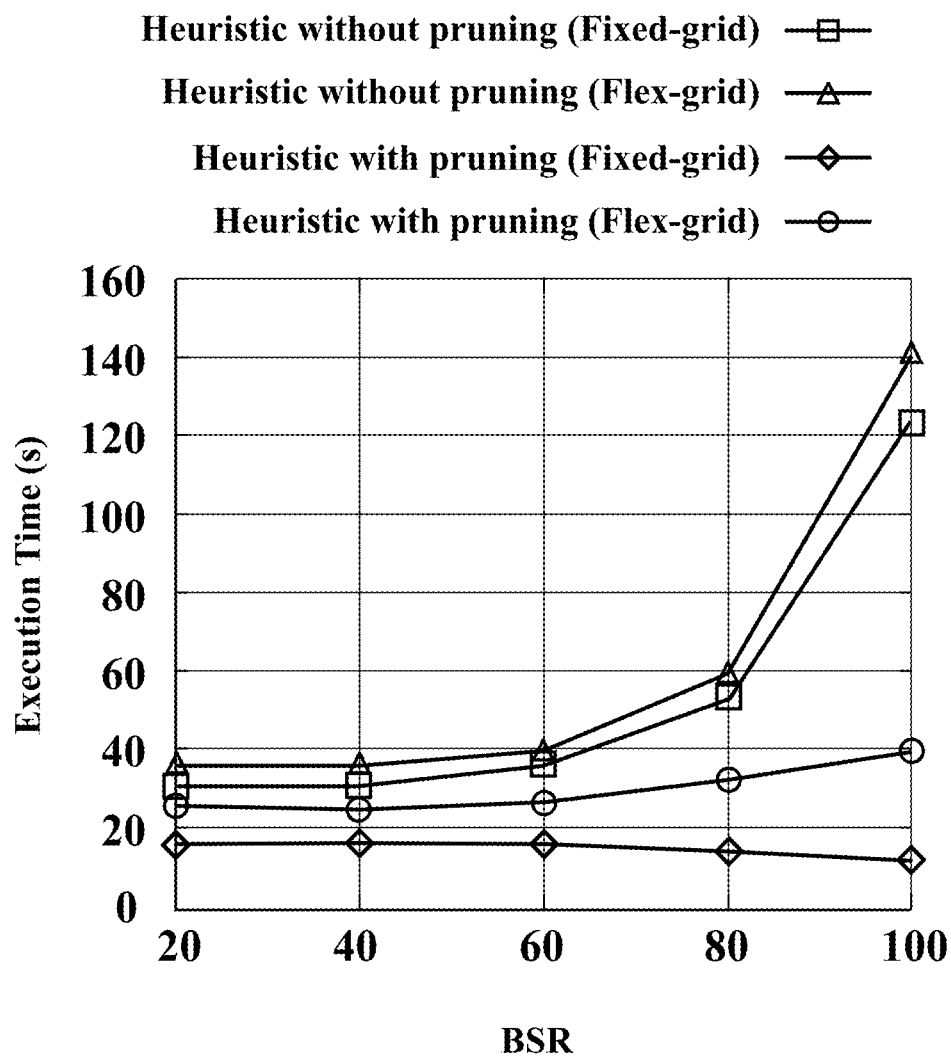

FIGS. 14 and 15 illustrate the impact of varying BSR on frequency slots usage and execution time of heuristic algorithm for large network with and without pruning procedures. For large networks, getting a solution for embedding a virtual network using ILP may be computationally intractable. However, heuristic algorithm as discussed in the present disclosure may provide near-optimal solutions which are on average within 10% of the exact solution of ILP. Further, flexible-grid structure allows for much higher network efficiency manifested in lower frequency slots usage.

Figure 16:
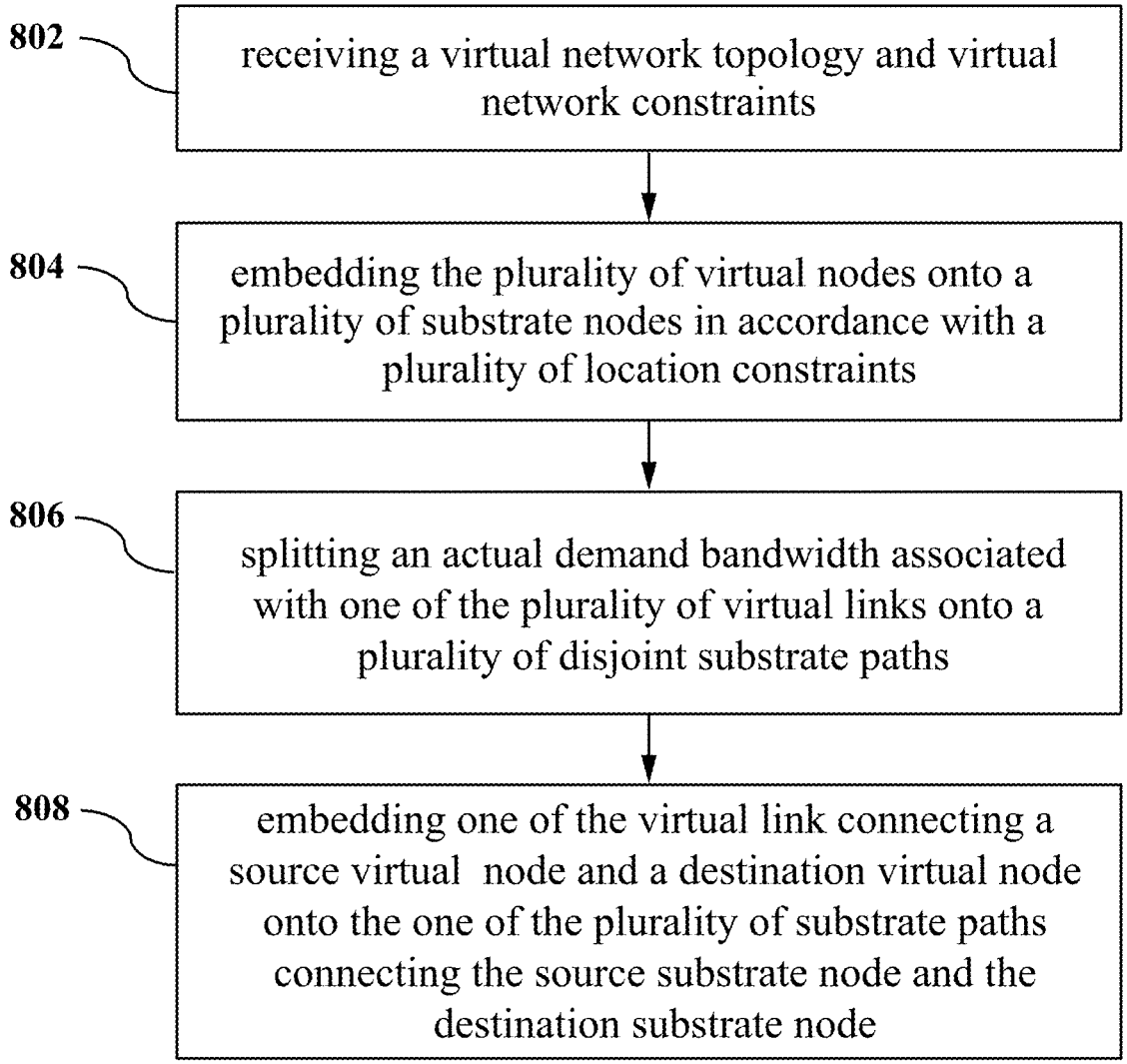
FIG. 16 depicts a functional flow diagram of a process directed to a method implemented in the system, in accordance with various embodiments of the present disclosure.

FIG. 16 depicts a functional flow diagram of process 800 directed to a process implemented in the system 100, in accordance with various embodiments of the present disclosure. The process 800 commences at task block 802, where the system 100 receive a virtual network topology and virtual network constraints, associated with the virtual network. As noted above, the system 400 may receive a request for a virtual network (e.g. virtual network 300), where the request may contain a virtual network topology and virtual network constraints associated with the virtual network. The virtual network topology may comprise VNodes (e.g. VNodes 302-1, 302-2, and 302-3), VLinks (e.g. VLinks 304-1 and 304-1), a bandwidth demand associated with each of the VLinks and BSR associated with each of the VLinks.

The process 800 advances to task block 804, where the system 100 performs embedding the plurality of virtual nodes onto the plurality of substrate nodes in accordance with the plurality of location constraints. As noted above the reliability-aware virtual network embedding system 400 may compute a node embedding function $\tau: \overline{V} \rightarrow V$, such that based on the node embedding function $\tau$ the reliability-aware virtual network embedding system 400 performs embedding of each VNode $\overline{u} \in \overline{V}$ to an SNode $u \in C(\overline{u})$ in accordance with their location constraints.

The process 800 advances to task block 806, where the system 100 splits a primary bandwidth demand associated with one of the plurality of virtual links connecting a source virtual node to a destination virtual node onto a plurality of disjoint substrate paths connecting a source substrate node and a destination substrate node, wherein the splitting of the primary bandwidth demand is performed in such a manner that in a case of failure of one of the plurality of disjoint substrate paths, a total bandwidth associated with the remaining plurality of disjoint substrate paths is at least equal to BSR times the primary bandwidth demand.

As noted above, the reliability-aware virtual network embedding system 400 may be configured to perform splitting of bandwidth demand $\overline{\beta}_{\bar{e}}$ associated the VLinks (e.g. VLink 304-1) onto a plurality of disjoint substrate paths connecting a source SNode (e.g. SNode 202-1) and a destination SNode (e.g. SNode 202-5), wherein the splitting of the bandwidth demand $\overline{\beta}_{\bar{e}}$ is performed in such a manner that in a case of failure of one of the disjoint SPaths connecting the source SNode and the destination SNode, a total bandwidth associated with the remaining disjoint SPaths is at least equal to BSR times the primary bandwidth demand.

Finally, at task block 808, where the system 100 performs embedding the one of the plurality of virtual links connecting the source virtual node to the destination virtual node onto the plurality of disjoint substrate paths connecting a source substrate node and a destination substrate node. As noted above, the reliability-aware virtual network embedding system 400 may embed a VLink (e.g. VLink 304-1) connecting a source VNode (e.g. VNode 302-1) and a destination VNode (e.g. VNode 302-1) onto disjoint SPaths connecting the source SNode (e.g. SNode 202-1) and the destination SNode (e.g. SNode 202-5).

It will be appreciated that the process 700, 720, 750, and 800 may also be performed by computer programs, which may exist in a variety of forms both active and inactive. Such as, the computer programs may exist as a software program(s) comprised of program instructions in source code, object code, executable code or other formats. Any of the above may be embodied on a computer-readable medium, which include storage devices and signals, in compressed or uncompressed form. Representative non-transitory computer readable storage devices include conventional computer RAM (random access memory), ROM (read-only memory), EPROM (erasable, programmable ROM), EEPROM (electrically erasable, programmable ROM), and magnetic or optical disks or tapes. Representative computer readable signals, whether modulated using a carrier or not, are signals that a computer hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer-readable medium. The same is true of computer networks in general.

It is to be understood that the operations and functionality of the system 100, constituent components, and associated processes may be achieved by any one or more of hardware-based, software-based, and firmware-based elements. Such operational alternatives do not, in any way, limit the scope of the present disclosure.

It will also be understood that, although the embodiments presented herein have been described with reference to specific features and structures, it is clear that various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

What is claimed is:

1. A method for reliability-aware virtual network embedding onto an elastic optical network comprising a plurality of substrate optical nodes and a plurality of substrate optical links connecting the substrate optical nodes, the method comprising:
   receiving a virtual network topology and virtual network constraints, associated with the virtual network, for embedding onto the elastic optical network, the virtual network topology comprising:
      a plurality of virtual nodes;
      a plurality of virtual links connecting the virtual nodes;
      a primary bandwidth demand associated with each of the plurality of virtual links;
   the virtual network constraints comprising:
      a plurality of location constraints associated with the plurality of virtual nodes, each location constraint providing an indication of at least one of the plurality of substrate optical nodes onto which one of the plurality of virtual nodes can be embed;
      a bandwidth squeezing rate (BSR) associated with the plurality of virtual links connecting the plurality of virtual nodes;
   generating an embedding plan for use in the virtual network onto the elastic optical network comprising:
      a mapping indicating the embedding the plurality of virtual nodes onto the plurality of substrate optical nodes in accordance with the plurality of location constraints;
      a mapping indicating the provisioning of the primary bandwidth demand associated with one of the plurality of virtual links connecting a source virtual node to a destination virtual node onto a plurality of disjoint substrate paths connecting a source substrate optical node and a destination substrate optical node, wherein:
         the provisioning of the primary bandwidth demand is performed in such a manner that in case of failure of one of the plurality of disjoint substrate paths, a total bandwidth associated with the remaining plurality of disjoint substrate paths is at least equal to BSR times the primary bandwidth demand; and
      embedding the one of the plurality of virtual links connecting the source virtual node to the destination virtual node onto the plurality of disjoint substrate paths connecting the source substrate optical node and the destination substrate optical node.

2. The method of claim 1, wherein the BSR times the primary bandwidth demand is less than or equal to the primary bandwidth demand.

3. The method of claim 1, further comprising allocating frequency slots to the plurality of disjoint substrate paths wherein allocating frequency slots comprises allocating same contiguous set of frequency slots to all of the plurality of disjoint substrate paths connecting the source substrate optical node and the destination substrate optical node.

4. The method of claim 1, wherein the provisioning of the primary bandwidth demand further comprises splitting the primary bandwidth demand associated with one of the plurality of virtual links connecting the source virtual node to the destination virtual node onto the plurality of disjoint substrate paths connecting the source substrate optical node and the destination substrate optical node.

5. The method of claim 1, further comprising generating the embedding plan of the virtual network using an integer linear programming (ILP) formulation.

6. The method of claim 5, wherein an objective function associated with the ILP formulation is given by;

$$\text{minimize}\left(\sum_{\forall e \in E} \sum_{\forall p \in P_{\bar{e}}^k} \sum_{\forall t \in T_{ep}} \sum_{i=1}^{q} \sum_{\forall s \in S} y_{\bar{e}ptis} \times |p| + \varepsilon \sum_{\forall e \in E} \sum_{\forall p \in P_{\bar{e}}^k} \sum_{\forall t \in T_{ep}} \sum_{i=1}^{q} w_{\bar{e}pti}\right)$$

Where:
- $E$ is a set individual virtual links $\bar{e}$;
- $P_{\bar{e}}^k$ is a set of k shortest substrate paths connecting the source substrate optical node and the destination substrate optical node for each virtual link $\bar{e} \in E$;
- $T_{\bar{e}p}$ is a set of admissible transmission configurations t;
- q is a maximum number of allowable splits in the one of the k shortest substrate paths;
- S is a set of equal-width frequency slots s;
- |p| is a total number of the plurality of substrate optical links associated with the one of the plurality of substrate paths p;
- $\varepsilon$ is selected in a manner that the second term in the objective function is effective only when multiple solutions have the same value as the first term;
- $y_{\bar{e}ptis}$ is a relationship between the one of the k shortest substrate paths, frequency slots s associated with the plurality of substrate optical links between the one of the k shortest substrate paths, one of the virtual links $\bar{e}$, one of the admissible transmission configurations t, and one of the allowable splits; and
- $w_{\bar{e}pti}$ is a relationship between the one of the k shortest substrate paths, one of the virtual links $\bar{e}$, one of the admissible transmission configurations t, and one of the allowable splits.

7. The method of claim 6, wherein $y_{\bar{e}ptis}$ is given by:

$$y_{epis} = \begin{cases} 1 & \text{if } \bar{e} \in E \text{ uses } s \in S \text{ on path } p \in P_{\bar{e}}^k \text{ with the i-th instance of } t \in T_{ep} \\ 0 & \text{Otherwise} \end{cases}$$

8. The method of claim 6, wherein $w_{\bar{e}pti}$ given by:

$$w_{epti} = \begin{cases} 1 & \text{if } \bar{e} \in E \text{ uses i-th instance of } t \in T_{ep} \text{ on path } p \in P_{\bar{e}}^k \\ 0 & \text{Otherwise} \end{cases}$$

9. The method of claim 6, wherein each of the admissible transmission configuration t is comprising of a specific baud-rate b, a modulation format m and a forward error correction code (FEC) overhead f.

10. The method of claim 1, further comprising generating the embedding plan of the virtual network using a heuristic approach.

11. The method of claim 10, wherein the heuristic approach further comprises:
ordering the plurality of virtual links in accordance with the availability of contiguous frequency slots in candidate substrate path sets associated with the plurality of disjoint substrate paths;
computing a multi-set of the plurality of disjoint substrate paths and their respective transmission configuration permutations connecting the source virtual node and the destination virtual node in accordance with the ordering of the plurality of virtual links;
allocating frequency slots to the plurality of disjoint substrate paths connecting the source virtual node and the destination virtual node; and
selecting a plurality of substrate paths from the multi-set of the plurality of disjoint substrate paths requiring minimum number of frequency slots to provision the primary bandwidth as well as BSR times the primary bandwidth demand in case of failure of one of the plurality of disjoint substrate paths.

12. The method of claim 11, wherein the ordering of the plurality of virtual links is performed in terms of commonality of substrate links associated with the plurality of disjoint substrate paths which are associated with the plurality of virtual links.

13. The method of claim 12, further comprising constructing an auxiliary graph to analyze commonality of substrate links.

14. The method of claim 11, wherein one of the candidate substrate path sets comprises k shortest disjoint substrate paths connecting the source substrate optical node and the destination substrate optical node.

15. A system for reliability-aware virtual network embedding onto a substrate optical network comprising a plurality of substrate nodes and a plurality of substrate links connecting the substrate nodes, the system comprising:
a processing unit for executing instructions; and
a memory unit for storing instructions, which when executed by the processor configure the system to perform steps for:
receiving a virtual network topology and virtual network constraints, associated with the virtual network, for embedding onto the elastic optical network, the virtual network topology comprising:
a plurality of virtual nodes;
a plurality of virtual links connecting the virtual nodes;
a primary bandwidth demand associated with each of the plurality of virtual links;
the virtual network constraints comprising:
a plurality of location constraints associated with the plurality of virtual nodes, each location constraint providing an indication of at least one of the plurality of substrate optical nodes onto which one of the plurality of virtual nodes can be embed;
a bandwidth squeezing rate (BSR) associated with the plurality of virtual links connecting the plurality of virtual nodes;
generating an embedding plan for the virtual network onto the elastic optical network comprising:
a mapping indicating an embedding of the plurality of virtual nodes onto the plurality of substrate optical nodes in accordance with the plurality of location constraints;
a mapping indicating the provisioning of the primary bandwidth demand associated with one of the plurality of virtual links connecting a source virtual node to a destination virtual node onto a plurality of disjoint substrate paths connecting a source substrate optical node and a destination substrate optical node, wherein:
the provisioning of the primary bandwidth demand is performed in such a manner that in case of failure of one of the plurality of disjoint substrate paths, a total bandwidth associated with the remaining plurality of disjoint substrate paths is at least equal to BSR times the primary bandwidth demand; and
embedding the one of the plurality of virtual links connecting the source virtual node to the destination virtual node onto the plurality of disjoint substrate paths connecting the source substrate optical node and the destination substrate optical node.

16. The system of claim 15, further comprising allocating frequency slots to the plurality of disjoint substrate paths wherein allocating frequency slots comprises allocating same contiguous set of frequency slots to all of the plurality of disjoint substrate paths connecting the source substrate optical node and the destination substrate optical node.

17. The system of claim 15, wherein the provisioning of the primary bandwidth demand further comprises splitting the primary bandwidth demand associated with one of the plurality of virtual links connecting the source virtual node to the destination virtual node onto the plurality of disjoint substrate paths connecting the source substrate optical node and the destination substrate optical node.

18. The system of claim 15, further comprising determining the embedding of the virtual network using an integer linear programming (ILP) formulation.

19. The system of claim 18, wherein an objective function associated with the ILP formulation is given by;

$$\text{minimize} \left( \sum_{\forall e \in E} \sum_{\forall p \in P_e^k} \sum_{\forall t \in T_{ep}} \sum_{i=1}^{q} \sum_{\forall s \in S} y_{\bar{e}ptis} \times |p| + \varepsilon \sum_{\forall e \in E} \sum_{\forall p \in P_e^k} \sum_{\forall t \in T_{ep}} \sum_{i=1}^{q} w_{epti} \right)$$

Where:
E is a set individual virtual links $\bar{e}$;
$P_{\bar{e}}^k$ is a set of k shortest substrate paths connecting the source substrate optical node and the destination substrate optical node for each virtual link $\bar{e} \in E$;
$T_{\bar{e}p}$ is a set of admissible transmission configurations t;
q is a maximum number of allowable splits in the one of the k shortest substrate paths;
S is a set of equal-width frequency slots s;
|p| is a total number of the plurality of substrate optical links associated with the one of the plurality of substrate paths p;
$\varepsilon$ is selected in a manner that the second term in the objective function is effective only when multiple solutions have the same value as the first term;
$y_{\bar{e}ptis}$ is a relationship between the one of the k shortest substrate paths, frequency slots s associated with the plurality of substrate optical links between the one of the k shortest substrate paths, one of the virtual links $\bar{e}$, one of the admissible transmission configurations t, and one of the allowable splits; and $w_{\bar{e}pti}$ is a relationship between the one of the k shortest substrate paths, one of the virtual links $\bar{e}$, one of the admissible transmission configurations t, and one of the allowable splits.

20. The system of claim 19, wherein each of the admissible transmission configuration t is comprising of a specific baud-rate b, a modulation format m and a forward error correction code (FEC) overhead f.

21. The system of claim 15, further comprising determining the embedding of the virtual network using a heuristic approach.

22. The system of claim 21, wherein the heuristic approach further comprises:

ordering the plurality of virtual links in accordance with the availability of contiguous frequency slots in candidate substrate path sets associated with the plurality of disjoint substrate paths;

computing a multi-set of the plurality of disjoint substrate paths and their respective transmission configuration permutations connecting the source virtual node and the destination virtual node in accordance with the ordering of the plurality of virtual links;

allocating frequency slots to the plurality of disjoint substrate paths connecting the source virtual node and the destination virtual node; and selecting a plurality of substrate paths from the multi-set of the plurality of disjoint substrate paths requiring minimum number of frequency slots to provision the primary bandwidth as well as BSR times the primary bandwidth demand in case of failure of one of the plurality of disjoint substrate paths.

* * * * *